(12) United States Patent
Mizuno et al.

(10) Patent No.: US 8,402,860 B2
(45) Date of Patent: Mar. 26, 2013

(54) STRUCTURE, MANIPULATOR AND STRUCTURE CONTROL SYSTEM

(75) Inventors: Osamu Mizuno, Osaka (JP); Akinobu Okuda, Osaka (JP); Tsuyoshi Tojo, Osaka (JP); Tohru Nakamura, Osaka (JP); Rie Takahashi, Osaka (JP); Soichiro Fujioka, Osaka (JP); Yoshihiko Matsukawa, Nara (JP)

(73) Assignee: Panasonic Corporation, Osaka (JP)

( * ) Notice: Subject to any disclaimer, the term of this patent is extended or adjusted under 35 U.S.C. 154(b) by 1202 days.

(21) Appl. No.: 12/249,414

(22) Filed: Oct. 10, 2008

(65) Prior Publication Data

US 2009/0095109 A1 Apr. 16, 2009

(30) Foreign Application Priority Data

Oct. 10, 2007 (JP) .................................. 2007-264279
Oct. 3, 2008 (JP) .................................. 2008-258303

(51) Int. Cl.
*B25J 18/00* (2006.01)
(52) U.S. Cl. ........................................ 74/490.01; 901/49
(58) Field of Classification Search ............... 74/490.01, 74/490.05; 901/15, 28, 29, 49, 50; 414/680, 414/729
See application file for complete search history.

(56) References Cited

U.S. PATENT DOCUMENTS 5,954,446 A * 9/1999 Ireland ............................. 403/11

FOREIGN PATENT DOCUMENTS

| JP | 61-249296 | 11/1986 |
|---|---|---|
| JP | 63-156676 | 6/1988 |
| JP | 3-24781 | 3/1991 |
| JP | 9-254078 | 9/1997 |
| JP | 10-164465 | 6/1998 |
| JP | 10-329071 | 12/1998 |
| JP | 2002-187090 | 7/2002 |
| WO | WO 2009080373 A1 * | 7/2009 |

OTHER PUBLICATIONS

Japanese Office Action (along with English translation) issued Dec. 8, 2009 in Japanese Application No. 2008-258303.
Japanese Office Action issued Aug. 31, 2010 in Application No. 2008-258303.

* cited by examiner

*Primary Examiner* — Phillip A Johnson
(74) *Attorney, Agent, or Firm* — Wenderoth, Lind & Ponack, L.L.P.

(57) ABSTRACT

A structure is provided with a first member at a base end side, a third member at a leading end side, a second member arranged between the first and third members, and a coupling force generator for generating a first coupling force for pressing an end surface of the first member and that of the second member against each other and a second coupling force for pressing an end surface of the second member and that of the third member against each other. In this structure, the first and third members are relatively displaced upon the application of an external force larger than a coupling force generated between the end surface of the first member and that of the second member by the first coupling force, whereas the second and third members are relatively displaced upon the application of an external force larger than a coupling force generated between the end surface of the second member and that of the first member by the second coupling force.

8 Claims, 15 Drawing Sheets

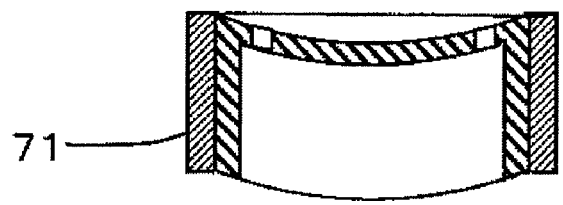
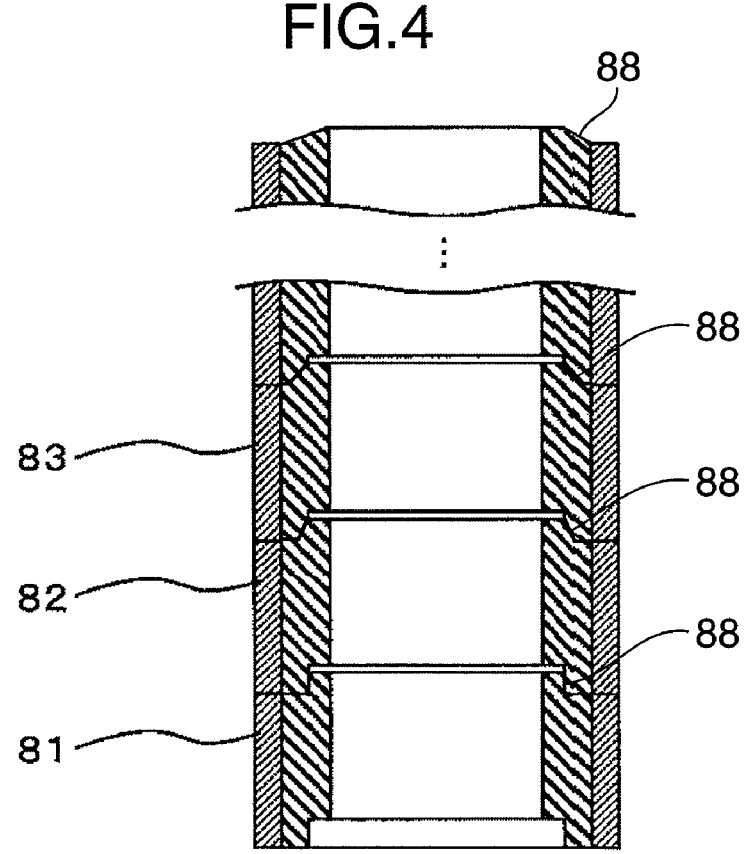

STRUCTURE, MANIPULATOR AND STRUCTURE CONTROL SYSTEM

BACKGROUND OF THE INVENTION

1. Field of the Invention

The present invention relates to a mechanism for moving goods, particularly to a robot manipulator, a structure and a structure control system used therefor.

2. Description of the Related Art

In recent years, the shortage and aging of the working population resulting from the falling birthrate and aging population have been predicted and robots for industry use and home use to compensate therefor have been expected. Particularly, manipulators and the like capable of gripping various goods are essential and important to do complicated operations. Various considerations are made on the application of these manipulators as artificial arms for people with disabled hands.

FIGS. 15 and 16 are diagrams showing a conventional manipulator disclosed in Japanese Unexamined Patent Publication No. S61-249296. In FIG. 15, identified by 803, 804 are arms, by 805 a hand device, and by 806 a work gripped by the hand device 805. FIG. 16 shows a safety device 807 of this manipulator provided in a connected part between the arm 804 and the hand device 805. The safety device 807 includes a first base 807a connected to the arm 804, a second base 807b and a supporting shaft 807i connecting the second base 807b relatively rotatable with respect to the first base 807a.

The hand device 805 is connected with the second base 807b. A pin 807a penetrates from the first base 807a to the second base 807b. Thus, normally, the second base 807b does not relatively rotate with respect to the first base 807a. Further, an insertion hole for the pin 807c is closed by a bolt 807d to prevent the pin 807c from dropping.

If a work 806 collides with an external object, the pin 807c is sheared by a resulting impact, whereby the second base 807b becomes rotatable with respect to the first base 807a. Since the hand device 805 and the work 806 become rotatable about the supporting shaft 807i, the transfer of kinetic energy to the hand device 805 when the object collides with the arms 803, 804 is prevented, whereby the breakage of the hand device 805 can be prevented.

However, the safety device of the conventional manipulator had the following problems. Specifically, if an object collides on an extension of the supporting shaft 807i, the pin 807c is not sheared. Thus, the safety device 807 does not function. Further, if an object collides with the arms 803, 804, the total masses of the arms 803, 804 act on the colliding object. Thus, if a person collides, danger is predicted.

SUMMARY OF THE INVENTION

An object of the present invention is to provide a structure which overcame the above problems.

One aspect of the present invention is directed to a structure, comprising a first member including a base portion fixed to the outside; a second member; a third member including a leading end portion; and a coupling force generator for generating a first coupling force for maintaining a relative positional relationship of the first and second members and a second coupling force for maintaining a relative positional relationship of the second and third members, wherein the first, second and third members are connected to each other, and the first coupling force is larger than the second coupling force.

BRIEF DESCRIPTION OF THE DRAWINGS

FIG. 3 is a section partly showing a structure according to a modification of the first embodiment of the invention, FIG. 4 is a section partly showing a structure according to a modification of the first embodiment of the invention.

DETAILED DESCRIPTION OF THE PREFERRED EMBODIMENTS OF THE INVENTION

Hereinafter, embodiments of the present invention are described with reference to the accompanying drawings.

First Embodiment

Figure 1A:
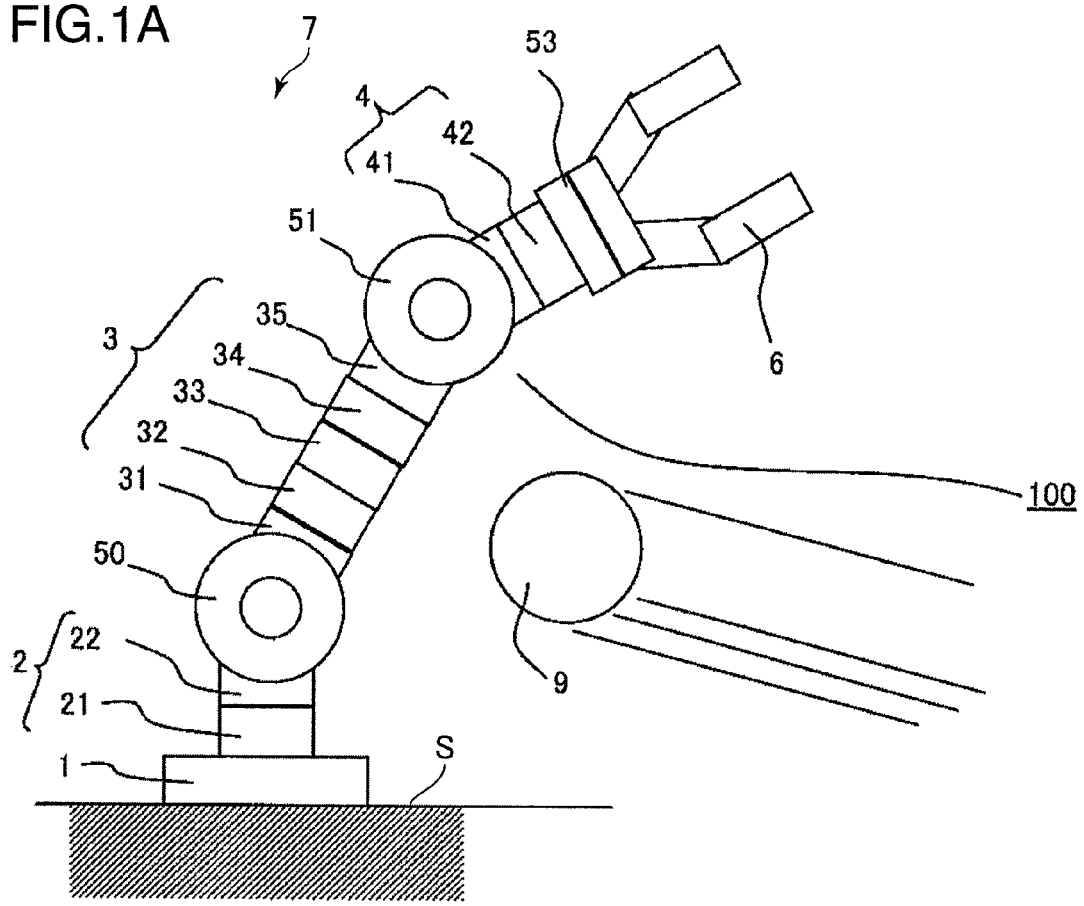
FIGS. 1A and 1B are diagrams schematically showing a manipulator provided with a structure according to a first embodiment of the invention.
Figure 1B:
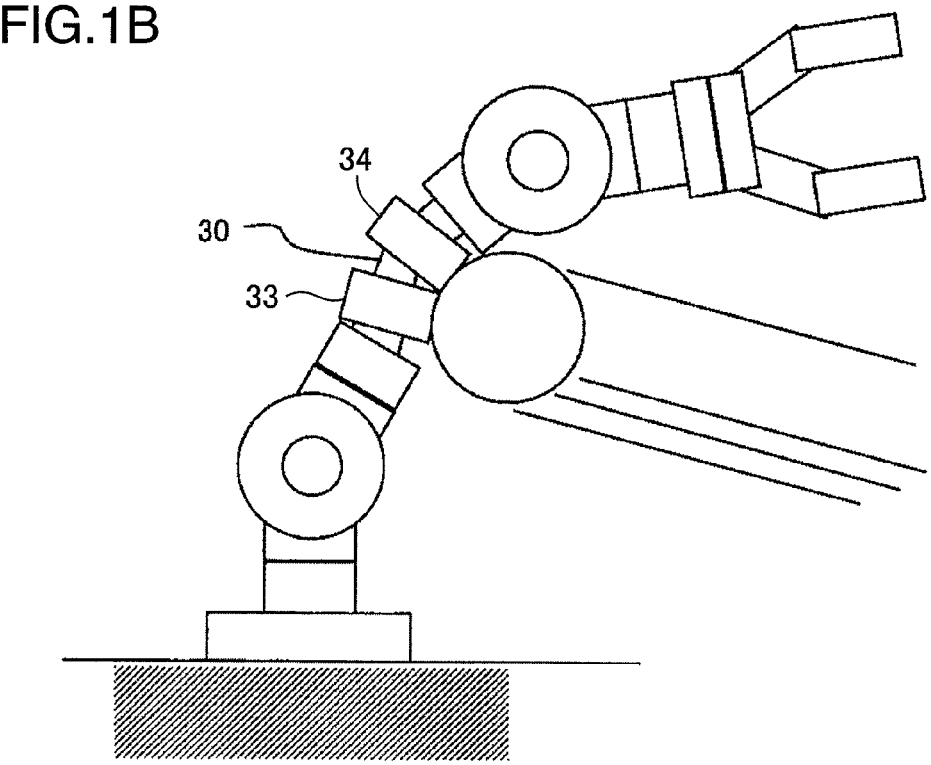
Figure 2:
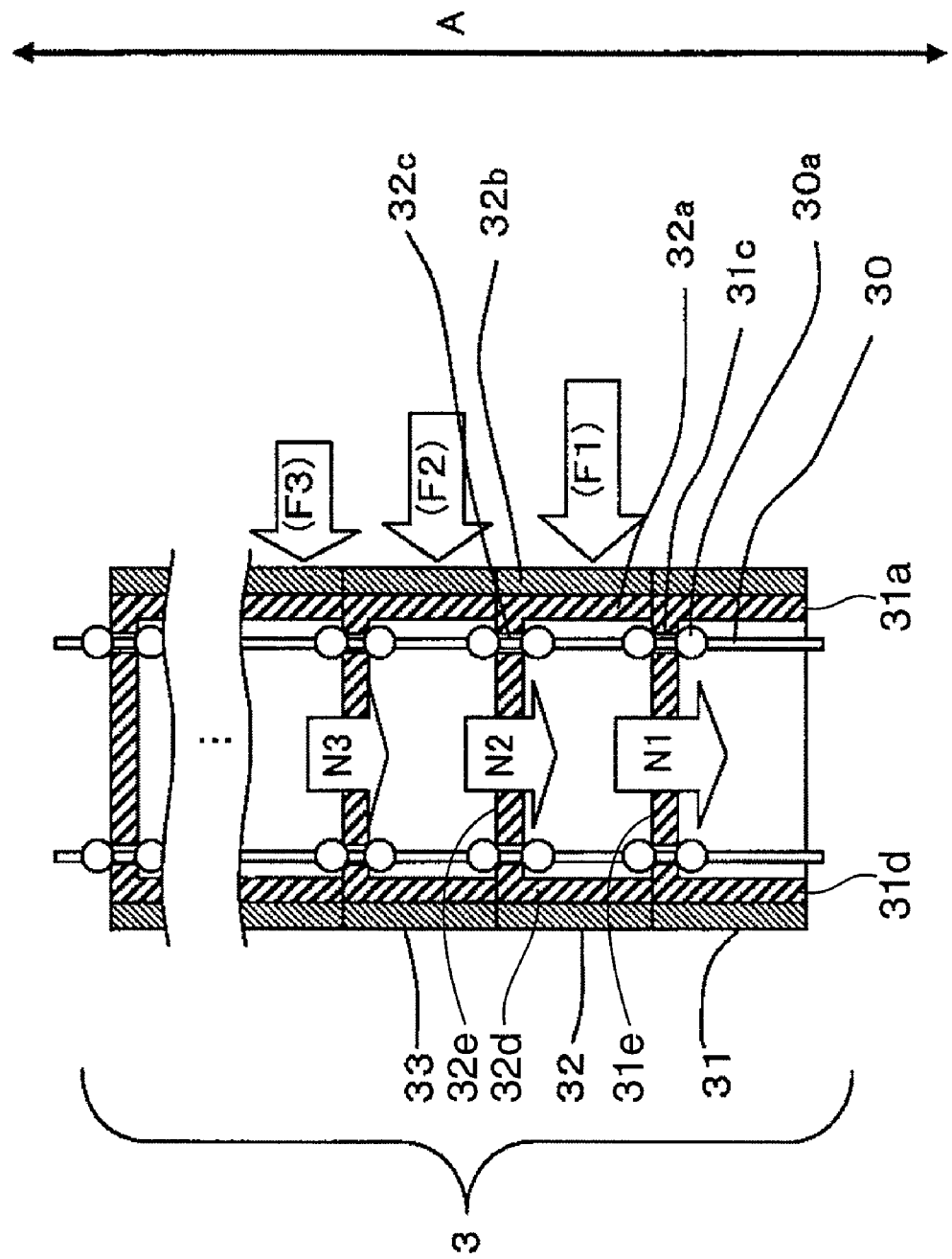
FIG. 2 is a section partly showing the structure.

FIGS. 1A, 1B and 2 are diagrams showing a manipulator including a structure 7 according to a first embodiment of the present invention. The manipulator is provided with a structure 7 and a hand mechanism 6 as an end effector. This structure 7 includes arms 2, 3 and 4, first and second joints 50, 51 and a third joint 53 for the hand mechanism 6.

As shown in FIG. 1A, the arm 2 includes a base 1 (base portion). It is assumed that the base 1 is fixed to a reference surface S as a fixed body. The arm 2 (first member) includes members 21, 22; the arm 3 (second member) includes members 31 to 35; and the arm 4 (third member) includes members 41, 42. The member 21 is supported on the base 1. In other words, the structure 7 included in the manipulator includes a total of nine members, which are connected to each other to be aligned. The member 21 of the arm 2 fixed to the base 1 is a first member (base end side member), and the member 42 of the arm 4 connected with the third joint 53 is a third member (leading end side member). The members 22 to 41 between these are connecting members constituting a second member (intermediate body). A base end surface of the member 21 fixed to the base 1 serves as a fixing portion.

The first joint 50 connects the arms 2, 3 relatively rotatable about an axis vertical to the plane of FIG. 1, and the arm 3 rotates relative to the arm 2 by the presence of the first joint 50. Specifically, the first joint 50 includes two members rotatable relative to each other, wherein the member 22 of the arm 2 is fixed to one member and the member 31 of the arm 3 is fixed to the other member. In other words, the first joint 50 is arranged between the member 22 as a first connecting member and the member 31 as a second connecting member.

The second joint 51 connects the arms 3, 4 relatively rotatable about an axis vertical to the plane of FIG. 1, and the arm 4 rotates relative to the arm 3 by the presence of the second joint 51. Specifically, the second joint 51 includes two members rotatable relative to each other, wherein the member 35 of the arm 3 is fixed to one member and the member 41 of the arm 4 is fixed to the other member. In other words, the second joint 51 is arranged between the member 35 as a first connecting member and the member 41 as a second connecting member. The third joint 53 for rotating the hand mechanism 6 about an axis parallel to the plane of FIG. 1 is arranged between the arm 4 and the hand mechanism 6.

Although the structure 7 including the joints 50, 51 and 53 is shown in this embodiment, the structure is not limited to this construction. For example, the structure may include only arm 3 having no joint. In this construction, the member 31 serves as the first member (base end side member) directly or indirectly connected with a fixed body, the member 35 serves as the third member (leading end side member), and the members 32 to 34 serve as the connecting members constituting the second member (intermediate member).

FIG. 2 is a section of the arm 3 along a direction parallel to a longitudinal direction. The members 31 to 35 constituting the arm 3 are aligned. The arm 3 as a whole has a longitudinal direction in one direction (direction A in FIG. 2). End surfaces of the respective members 31 to 35 in contact with the adjacent members are flat surfaces substantially perpendicular to the direction A (longitudinal direction). The direction A parallel to these end surfaces are defined as a horizontal sectional direction.

Any of the members 31 to 35 has a similar shape. For example, the member 32 is comprised of a rigid structural portion 32a made of a rigid material and an outer covering 32b mounted around the rigid structural portion 32a. The rigid structural portion 32a is in the form of a bottomed cylindrical or polygonal column. In a shown example, the rigid structural portion 32a has a tubular trunk portion 32d and a plate-like spanning portion 32e fixed inside the trunk portion 32d. The spanning portion 32e is in the form of a plate extending in a direction orthogonal to an axial direction of the member 32 and mounted in the trunk portion 32d. The outer covering 32b is made of an elastic material such as urethane rubber or silicon rubber. In FIG. 2, the lower end surface of the member 32 is a first end surface and the upper end surface thereof is a second end surface. A first end surface of the intermediate member is an end surface of the member 22 at the base end side, and a second end surface thereof is an end surface of the member 41 at the leading end side.

The rigid structural portion 32a is made of a resin having both light weight and rigidity, preferably of PPS reinforced with glass fiber or the like. Further, if it is desired to suppress vibration, it is preferable to use a liquid crystal polymer as the material of the rigid structural portion 32a.

The arm 3 includes a pulling mechanism as a coupling force generator. The pulling mechanism includes wire rods 30 made of an elastic material, and stoppers 30a fixed to these wire rods 30. The spanning portion 31e of the rigid structural portion 31a of the member 31 is formed with a through hole 31c, and the spanning portion 32e of the rigid structural portion 32a of the member 32 is formed with a through hole 32c. The wire rods 30 are passed through the through hole 31c and reach the through hole 32c of the member 32. The stoppers 30a provided on the wire rods 30 prevent movements of the members 31, 32 in the axial direction with the members 31, 32 held in contact. Specifically, the wire rods 30 pull the member 32 toward the member 31 by being engaged with the spanning portions 31e, 32e formed with the through holes 31c, 32c by the action of the stoppers 30a. In other words, the pulling mechanism generates a coupling force for pressing the members 32, 31 against each other between the base end side end surface (first end surface) of the member 32 and the leading end side end surface (second end surface) of the member 31. This coupling force is referred to as N1.

The wire rods 30 are similarly passed through the members 33 to 35. Thus, the pulling mechanism also generates coupling forces between the members 32, 33, between the members 33, 34 and the like. These coupling forces are referred to as N2, N3, etc. Here, the magnitudes of the respective coupling forces are N1>N2>N3, . . . due to the movement prevention of the wire rods 30 by the stoppers 30a. The respective members are pressed against each other by these coupling forces.

By the above coupling forces, friction forces resisting forces in the transverse sectional direction are produced between the respective members. For example, it is assumed that F1 denotes a maximum static friction force produced against the coupling force N1 between the members 31 and 32, and F2 denotes a maximum static friction force against the coupling force N2 produced between the members 32 and 33. In other words, Fi denotes a maximum static friction force against a coupling force Ni between the members (30+i) and (30+i+1).

Since the maximum static friction forces obey Amonton-Coulomb's laws, the coupling forces are N1>N2>N3, . . . and the maximum static friction forces are F1>F2>F3, . . . .

Relative differences of these coupling forces can be realized, for example, by the following construction. Specifically, if the dimensions (axial lengths) of the members 32, 33, 34, . . . in the direction A are equal, the free lengths of the wire rods 30 stretched between the individual stoppers 30a may be so set as to be shortest in the member 31 and to gradually increase in an order of the members 32, 33, . . . . By doing so, strain caused by the extension of the wire rods 30 is largest in a part corresponding to the member 31, wherefore the coupling force N1 is largest. Accordingly, the coupling forces realized by restoring forces are N1>N2>N3, . . . .

The construction for making the magnitudes of the coupling forces N1, N2, . . . different is not limited to the above one. For example, elastic forces of the wire rods 30 may be gradually changed in its lengthwise direction (axial direction). In this case, a construction for making the cross-sectional areas of the wire rods 30 different in their lengthwise direction or a construction for making the elastic moduli of the wire rods 30 different in its lengthwise direction may be adopted.

Alternatively, a plurality of wire rods having different elastic forces may be arranged between the respective members. In this construction, even if some of the wire rods become unusable, the function of the manipulator 100 can be maintained by fixing the corresponding members.

Structures similar to that of the arm 3 can be realized in the arms 2 and 4. In the manipulator as a whole, (coupling force in the arm 2)>(coupling force in the arm 3)>(coupling force in the arm 4). Accordingly, in the structure 7, the magnitude (first magnitude) of the coupling force between the leading end surface (upper end surface in FIG. 1A) of the base end side member 21 and the base end side end surface (first end surface; lower end surface in FIG. 1A) of the member 22 is larger than the magnitude (second magnitude) of the coupling force between the leading end side end surface (second end surface) of the member 41 and the base end surface of the leading end side member 42.

Further, the coupling forces between the members located at the base end sides of the joints 50, 51 are set to be larger than the coupling forces between the members located at the leading end sides of the joints 50, 51. Specifically, the magnitude of the coupling force between the members 21 and 22 constituting the arm 2 located at the base end of the first joint 50 is larger than that of the coupling force between the members 31 and 32 of the arm 3 located at the leading end side of the first joint 50. Further, the magnitude of the coupling force between the members 34 and 35 constituting the arm 3 located at the base end side of the second joint 51 is set to be larger than that of the coupling force between the members 41 and 42 of the arm 4 located at the leading end side of the second joint 51.

A state where the respective members are not displaced in the transverse sectional direction with respect to the adjacent members is assumed as a normal state. Here, the influence of gravitational force is ignored. For example, a case where the member 32 and all the members thereabove in FIG. 2 are displaced in the transverse sectional direction relative to the member 31 at such a low acceleration that an inertial force can be ignored is thought. The maximum static friction force F1 is necessary to cause slip between the members 31 and 32.

If it is tried to move only the member 32 relative to the other members in the transverse sectional direction, slip has to be caused between the members 31 and 32 and between the members 32 and 33. Thus, the sum of the maximum static friction forces F1+F2 is necessary. Preferably, the construction for creating such coupling forces is formed, for example, in each of the arms 2, 3 and 4. This can make it unnecessary to lay the wire rods 30 beyond the joints 50, 51 and can make the influence of the posture and the like less susceptible.

The operations of the structure and the manipulator constructed as described above are described below.

It is assumed that an object 9 approaches the manipulator 100 as shown in FIG. 1A and collides therewith as shown in FIG. 1B. At this time, if the object 9 collides with the members 33, 34 of the arm 3, the members 33, 34 start being displaced in the transverse sectional direction as shown in FIG. 1B if an impact force exceeds F2+F4. If the object 9 has sufficient kinetic energy, the members 33, 34 start making accelerated motions and are displaced from the normal state.

A force created in the object 9 as reaction of the collision at this time is substantially caused by the masses of the members 33, 34 and can be made relatively smaller than the reaction of the entire arm 3 as the structure or the entire manipulator 100. In other words, a part of the received external force can be absorbed by displacing the member having received the external force and the member(s) adjacent to this member.

As described above, in this embodiment, the reaction force in the event of a collision is reduced by the separation of the mass of the manipulator 100. Thus, damage caused by the collision of the object 9 can be avoided. This is a relative relationship, and the situation is the same even if the object 9 is a stationary person and the arm 3 or the manipulator 100 moves to approach the person. Therefore, according to this embodiment, the damage of a human body can be avoided.

If the object 9 collides at a position deviated from the central axis of the arm 3, e.g. comes into contact in such a state as to touch the side surface of the arm 3, a rotational moment about the central axis of the arm 3 is created, but a static force against this moment increases according to the coupling force. Thus, in this embodiment, an effect similar to the one in the above case of an impact in the transverse sectional direction is brought about.

Since the maximum static friction forces and the coupling forces are larger at the base end of the structure 7, a large acceleration can be given to the leading end side while a moment created at the base end side upon making a rotational motion or the like is resisted.

Although the arm 3 is straight here, it may be, for example, curved in the longitudinal direction. In this case, the respective members are formed by dividing the arm 3 by flat surfaces or curved surface having local tangents in the longitudinal direction as average normals.

Even if the arm 3 is straight, it does not matter to have curved dividing surfaces instead of the flat dividing surfaces of the members shown in FIG. 2. For example, a member 71 having a curved surface as shown in FIG. 3 may be used. In this case, since the curved surfaces are in contact, contact areas of the members increase, whereby friction forces against a force in the transverse sectional direction can be made more stable and connection at a normal position can be clearly known.

50 N or lower is, for example, recommended as a value up to which a human endures pain. If one member is displaced in the transverse sectional direction, friction forces act on the respective upper and lower surfaces. Thus, if a section where a maximum static friction force is created lies in the member 32, the coupling forces N1, N2 by the wire rods 30 are preferably set, for example, such that F1+F2<about 50 [N].

Projection connection as shown in FIG. 4 can also be used as a construction for positioning members at normal positions in the transverse sectional direction. In this case, end surfaces of the members 81, 82, 83, . . . with respect to the longitudinal direction are not flat surfaces, but stepped surfaces having inclined surfaces 88. Thus, a projected part is provided on one end surface of each of the members 81, 82, 83, . . . and a recessed part corresponding to the projected part is formed in the other end surfaces of each of the members 81, 82, 83, . . . . Besides this, pin connection or the like can also be adopted. These can be connected by the above wire rods 30.

In each member, a hole is formed in a central part of a spanning portion. These holes are used as a path for wire connection to a motor in the first joint 50 and the like, supporting shafts of the arms, etc. Such holes are formed in the members 31, 32 of FIG. 2, the member 71 of FIG. 3 and the like. Wiring and the like to the motor are preferably covered by slidable coatings including a fluororesin material such as Teflon produced by Dupont in order to reduce the influence and the like of friction caused by displacements of the members. The diameter of these holes is preferably larger than the diameters of the supporting shafts of the arms and the like. This is to reduce the influence of forces exerted to the supporting shafts of the arms and the like by the displacements of the respective members.

The wire rods 30 may be made of a shape-memory alloy or may be a serial connection of shape-memory alloy pieces and springs. In this case, the coupling forces can be made variable by current heating and cooling.

If the member is displaced in the transverse sectional direction, the wire rods 30 produce a restoring force to return the member to an initial position. If a restoring force-displacement characteristic is set such that the restoring force suddenly increases in relation to the displacement by a linear function or higher order function, preferably by a quadratic function or the like, a probability of restoring the member to the vicinity of the normal position after an impact is preferably increased. Such a characteristic can be realized, for example, by the following method. In other words, if the restoring force of the wire rods 30 in a pulling direction is linear in relation to the deformations of the wire rods 30 as in the structure of FIG. 2, the restoring force in relation to the displacement in the transverse sectional direction nonlinearly increases.

Figure 5:
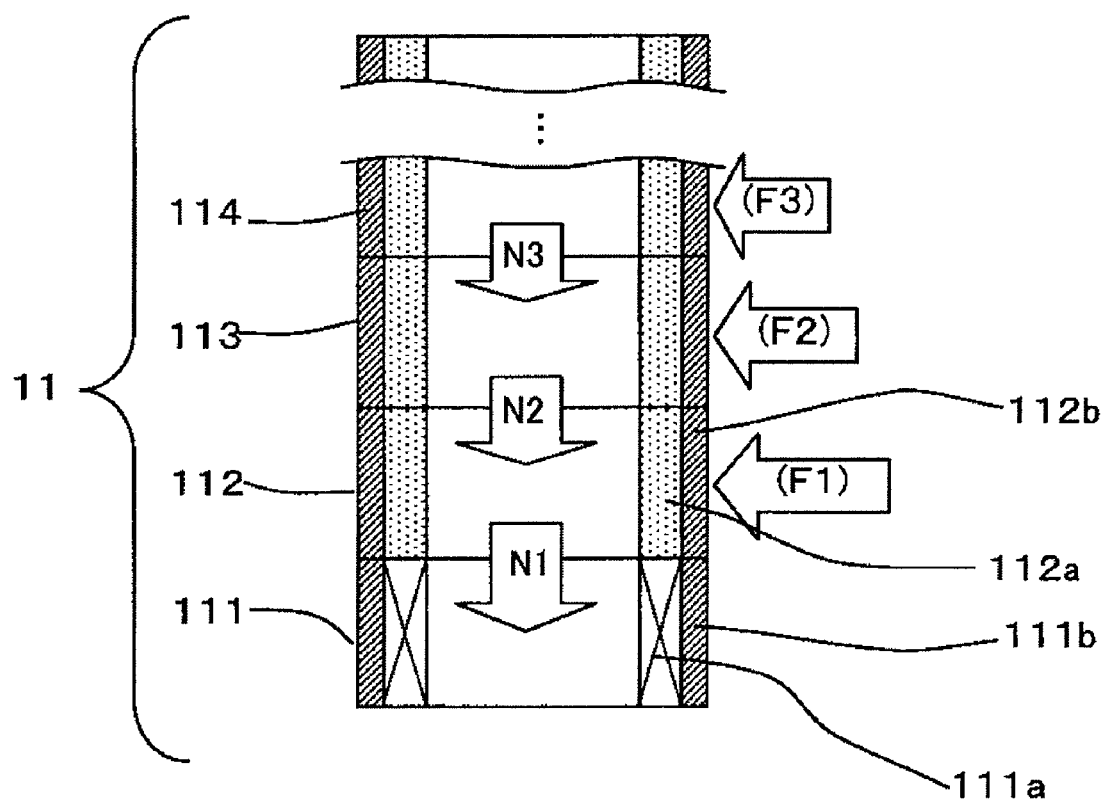
FIG. 5 is a section partly showing a structure according to a modification of the first embodiment of the invention.

Instead of the wire rods 30, a construction utilizing a magnetic force as shown in FIG. 5 may be used as the coupling force generator. An arm 11 includes members 111, 112, 113, 114, . . . and is arranged, for example, at the position of the arm 3 of FIG. 1. For example, the member 112 includes magnetic bodies 112a and an outer covering 112b, and the members 113, 114, etc. have a similar construction. In the arm 11, the member 111 arranged at a most base end side includes magnets 111a and an outer covering 111b. By such a construction, attraction forces N1, N2, . . . decrease as a distance from the magnets 111a increases. Accordingly, maximum static friction forces between the members can be easily set to be F1>F2>F3, . . . .

Figure 6A:
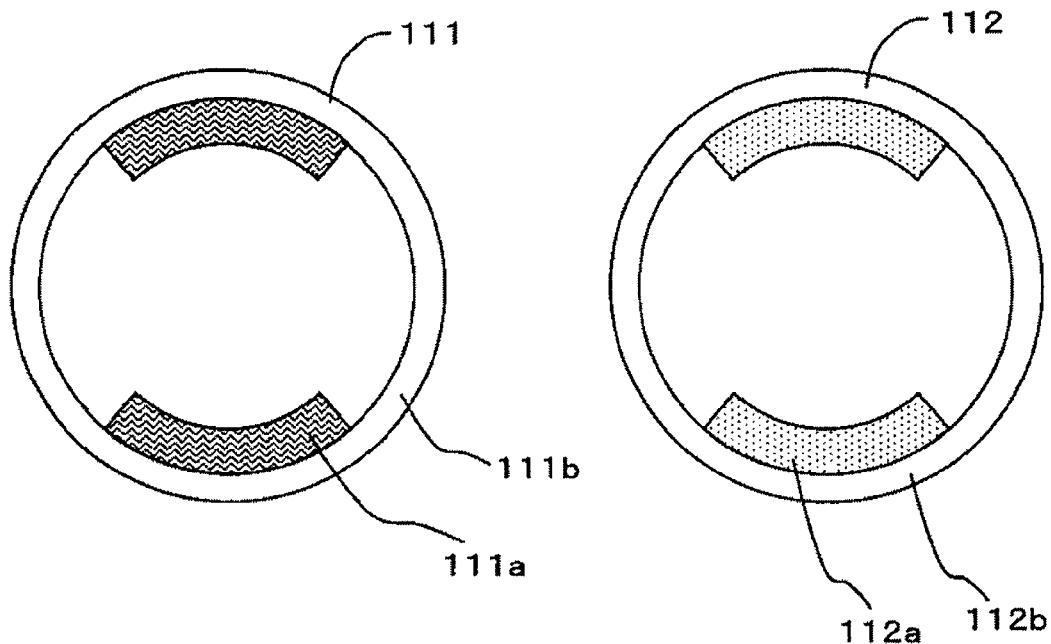
FIGS. 6A and 6B are sections partly showing a structure according to modifications of the first embodiment of the invention.
Figure 6B:
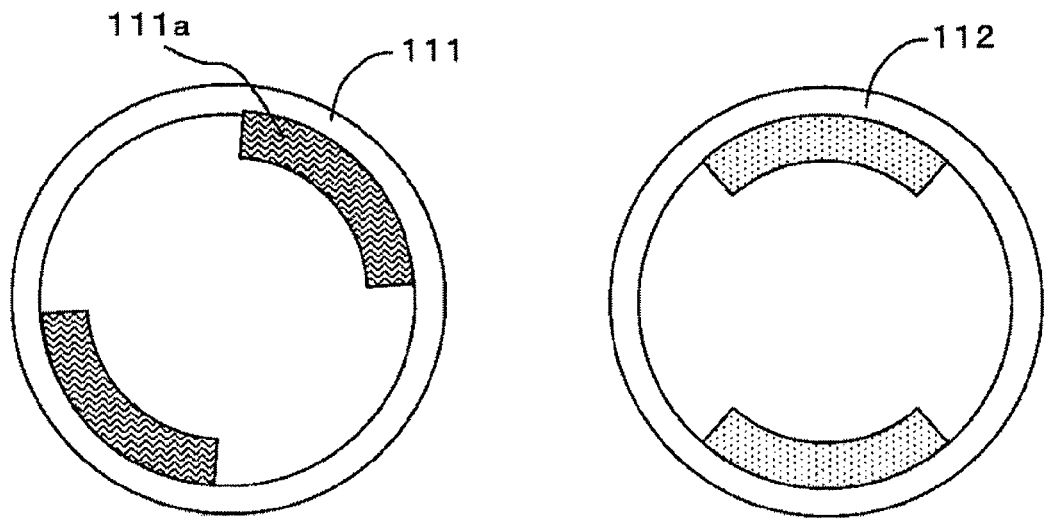

If the magnet 111a is an electromagnet, coupling forces to be generated can be varied by adjusting a current. Further, even if the magnets 111a are rotatable relative to the magnetic bodies 112a as shown in FIGS. 6A and 6B, the coupling forces can be varied. In other words, in a normal state, the magnets 111a of the member 111 and the magnetic bodies 112a of the member 112 are at the same circumferential position. By a circumferential movement of the magnet 111a of the member 111, center distances between the magnets 111a and the magnetic bodies 112a can be increased, whereby the coupling forces between the magnets 111a of the member 111 and the magnetic bodies 112a of the member 112 can be reduced. In this case, the outer covering 111b is preferably made of a hard material provided that it also fulfills a function of guiding the magnets 111a. In order to stabilize a vertical distance, it is also preferable to make the outer covering 112b of a hard material.

In a mode for making the members 111, 112, . . . rotatable about axes, the central axis positions of the members 111, 112, . . . are not displaced even in the case of receiving an external force. Thus, a member such as a transmission line inserted into the members 111, 112, . . . can be protected.

Figure 14:
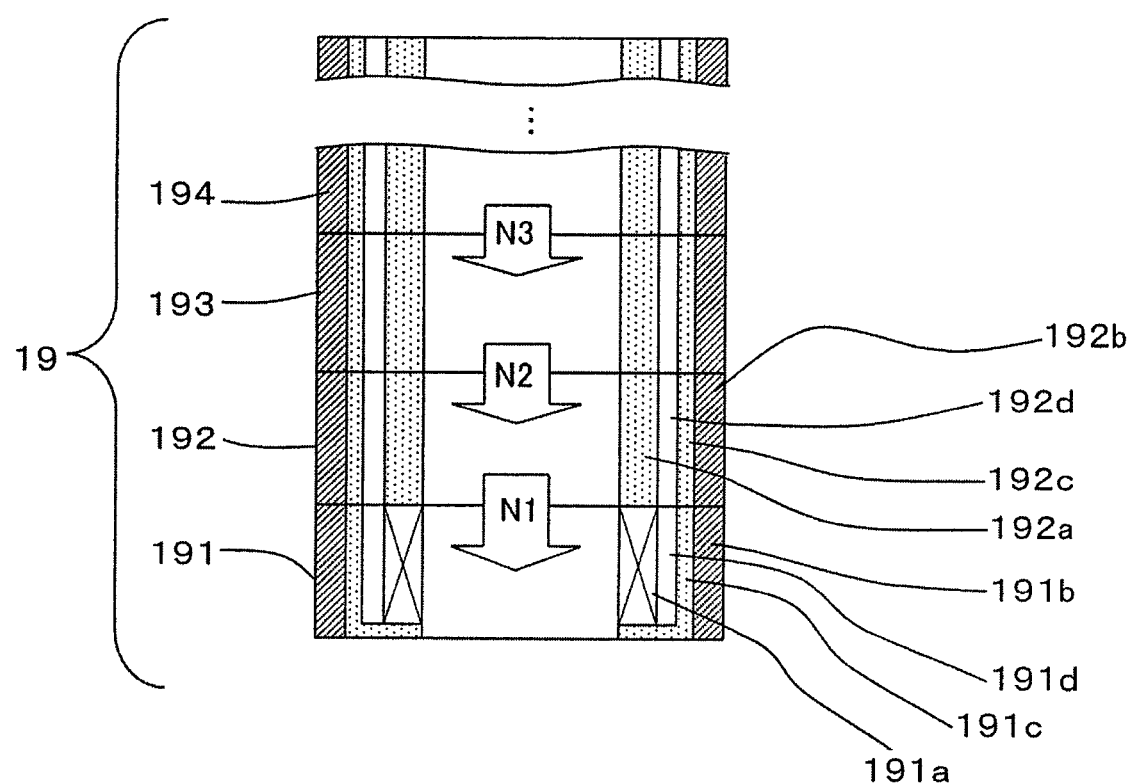
FIG. 14 is a diagram showing a magnetic circuit construction according to a modification of the first embodiment of the invention.
Figure 15:
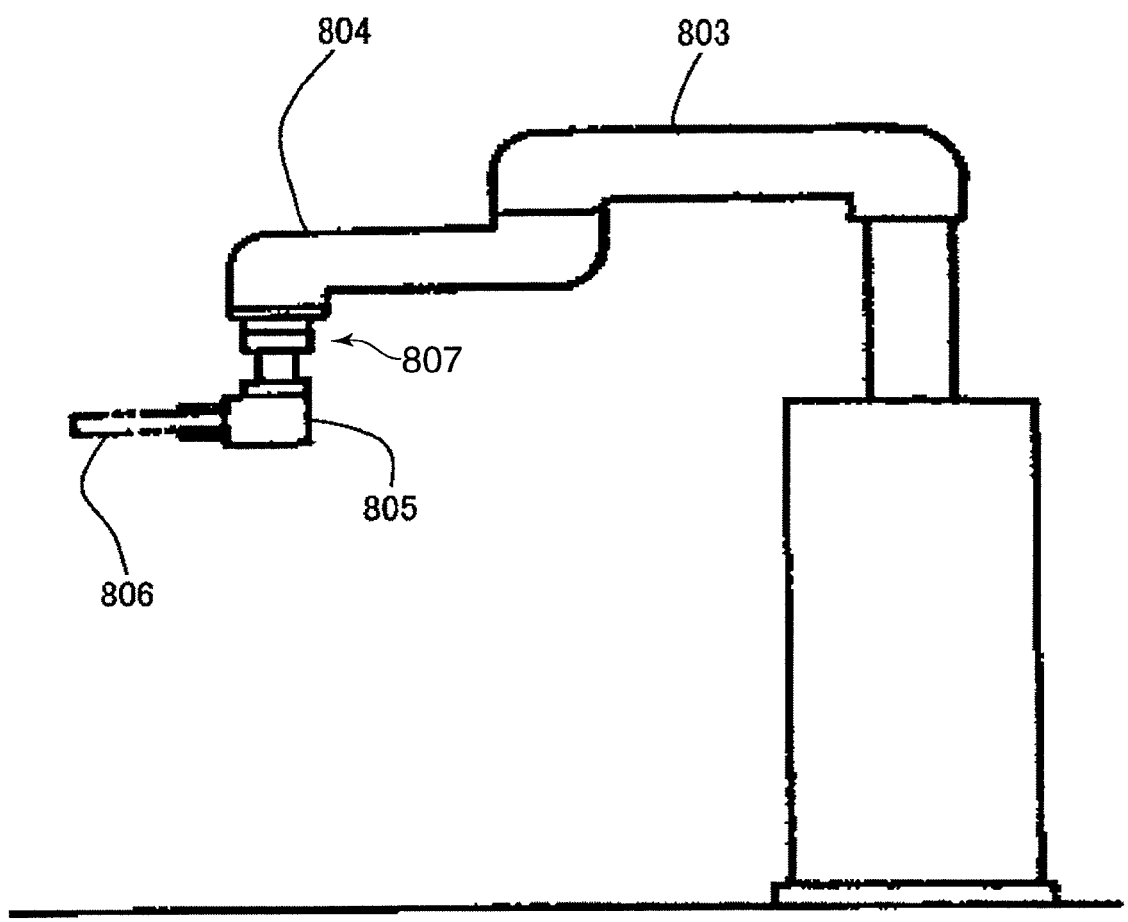
FIG. 15 is a construction diagram showing a conventional manipulator.
Figure 16:
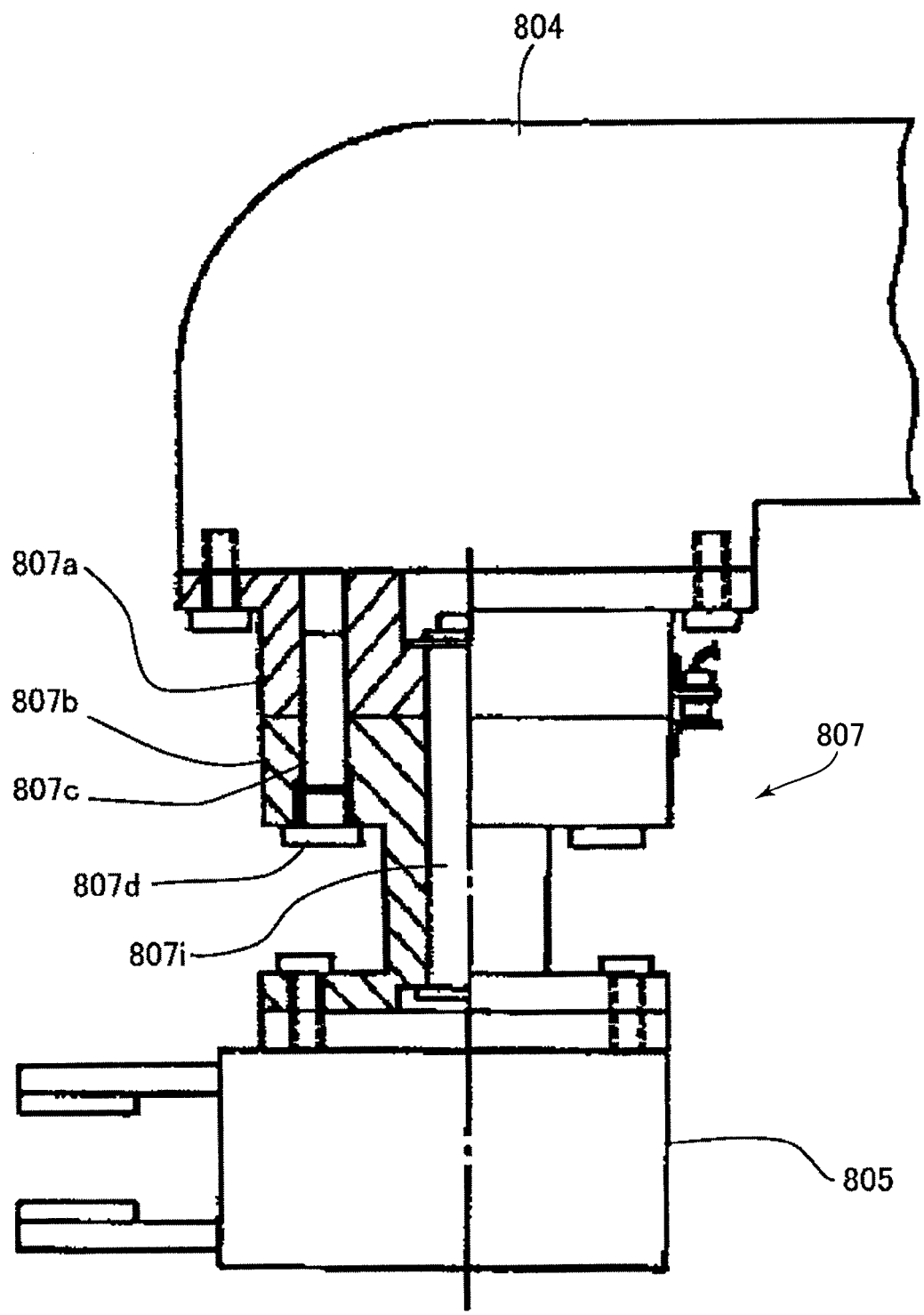
FIG. 16 is a detailed diagram showing the conventional manipulator.

A magnetic circuit construction may be constructed as shown in FIG. 14. An arm 19 is an alternative to the arm 11 and includes members 191, 192, . . . . The member 192 includes an inner magnetic body 192a, an outer magnetic body 192c, a nonmagnetic body 192d and an outer covering 192b. The nonmagnetic body 192d is arranged between the inner magnetic body 192a and the outer magnetic body 192c. The members 193, 194, etc. have a similar construction. On the other hand, the member 191 includes a magnet 191a, an outer magnetic body 191c, a nonmagnetic body 191d and an outer covering 191b. One end surface (surface distant from the member 192a) of the magnet 191a is magnetically connected with the outer magnetic body 191c, and the other end surface (surface toward the member 192) of the magnet 191a is magnetically connected with the inner magnetic body 192a of the member 192. By forming the arm 19 in this way, a distribution of attraction forces N1, N2, . . . similar to the arm 11 can be obtained and the magnetic circuit is substantially closed. Thus, the influence and the like by leakage magnetic flux to the outside can be reduced. Therefore, the influence and the like on the arms 2, 4 can be reduced.

By using the magnet and the magnetic bodies, there is no obstacle (wire rod 30, etc.) between the members upon a displacement. Thus, the influence on the object 9 can be made even smaller. However, the use of the magnet and the magnetic bodies may influence the surrounding due to a magnetic field. In such a case, measure needs to be taken against it according to needs.

The number of the wire rods 30 can be arbitrarily changed according to needs. However, three or more wire rods in the sections of the respective members are preferable to stably give coupling forces.

The outer coverings 31b, 32b, etc. are only examples and may be deleted unless necessary.

By being made of electric conductors, the wire rods 30 can have functions as signal lines, power lines and the like. However, the wire rods 30 are pulled in the event of a collision. Thus, if the wire rods 30 have functions as signal lines, power lines and the like, careful attentions need be paid to the strengths thereof.

In this embodiment, the maximum static friction forces are the main point and described in relation to the coupling forces between the members. However, the present invention also embraces a mode utilizing kinetic friction forces and the like as described later. Thus, it goes without saying that the coupling forces between the members are not necessarily essential.

Second Embodiment

Hereinafter, a second embodiment of the present invention is described with reference to the drawings.

Figure 7A:
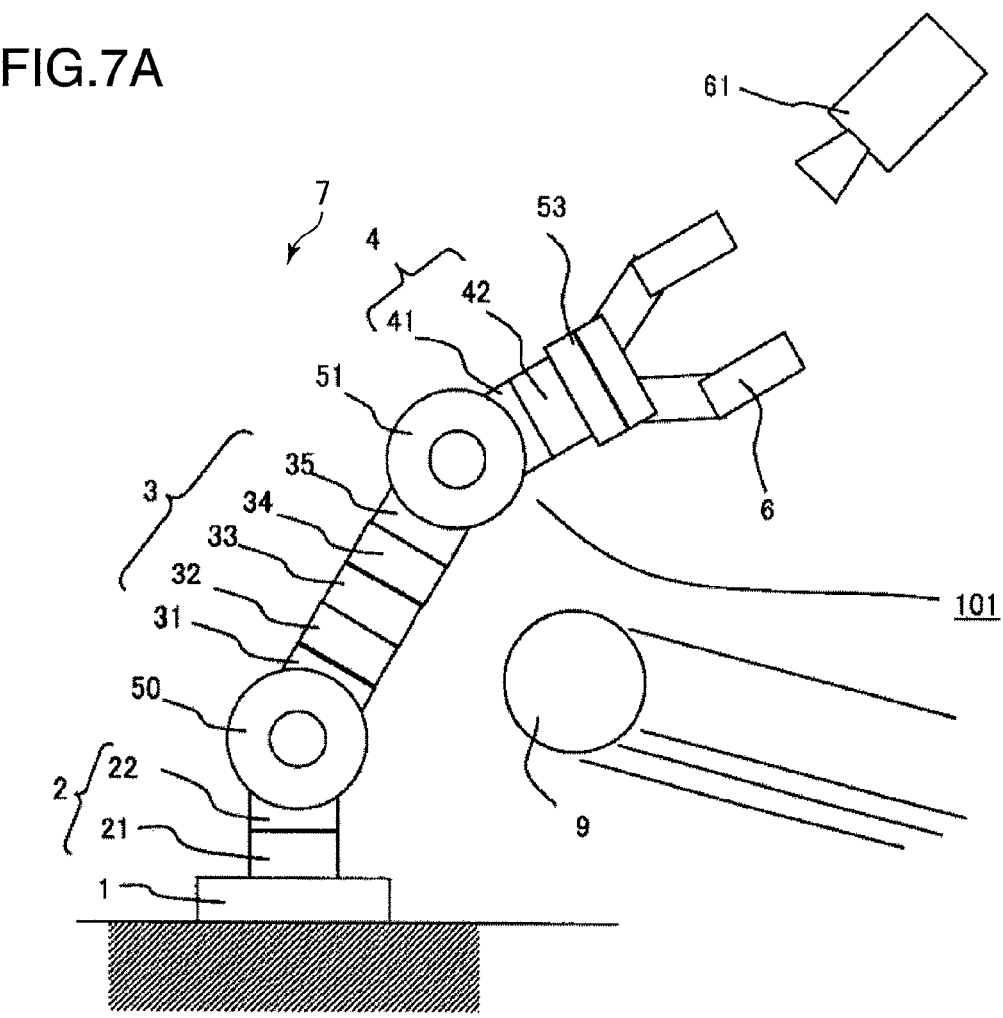
FIGS. 7A and 7B are diagrams schematically showing a structure control system provided with a structure according to a second embodiment of the invention.
Figure 7B:
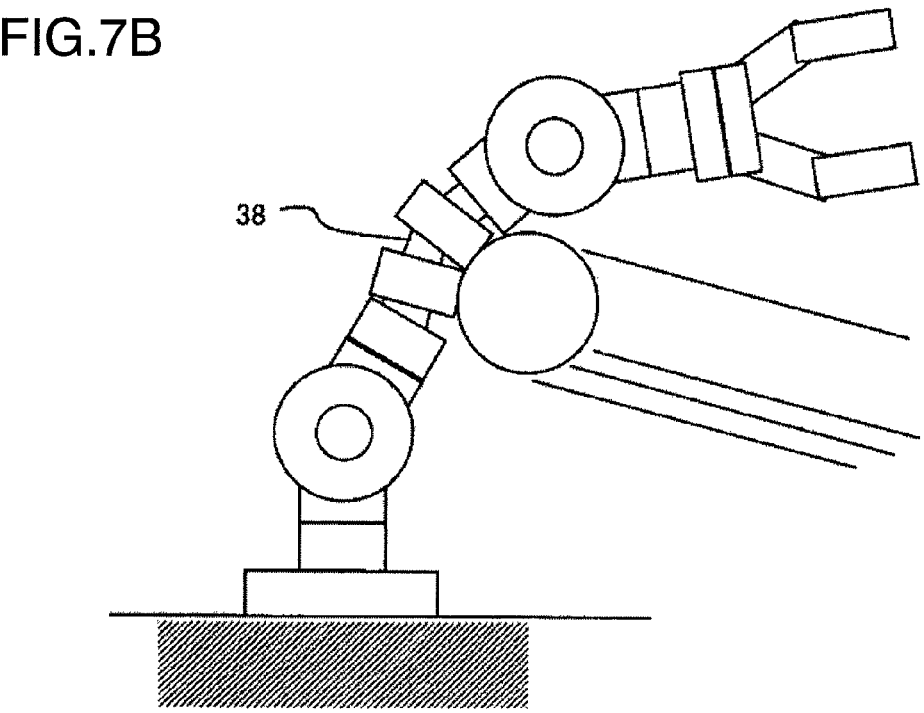
Figure 8:
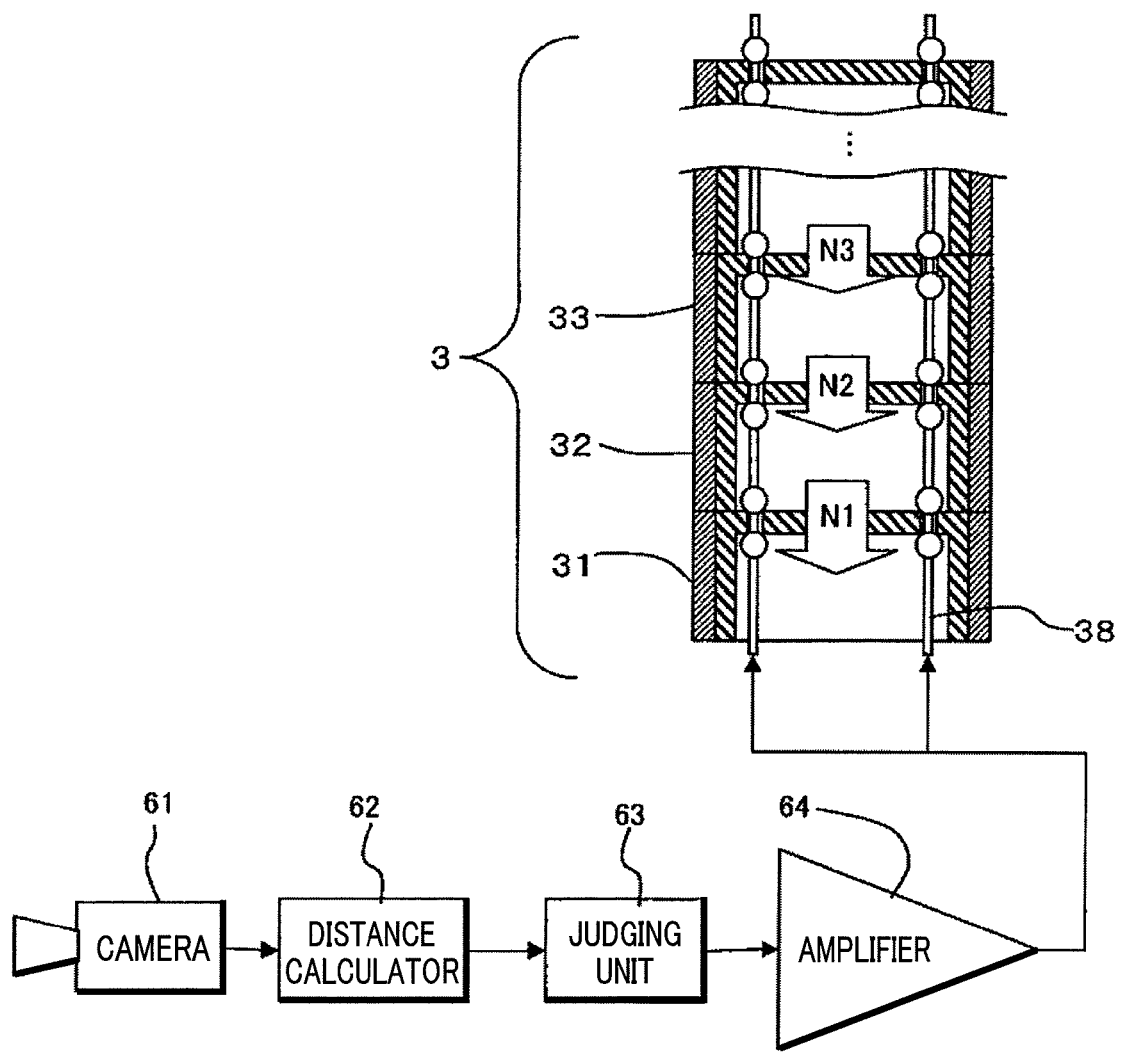
FIG. 8 is a block diagram showing the structure control system.

FIGS. 7A, 7B and 8 schematically show a structure, a manipulator and a control system according to the second embodiment of the present invention. The manipulator 101 of this embodiment includes wire rods 38 made of a shape-memory alloy instead of the wire rods 30 of the arm 3 of the first embodiment, and the other construction is the same as the manipulator 100 of the first embodiment including the object 9.

The control system includes a camera 61, a distance calculator 62, a judging unit 63 and an amplifier 64. The camera 61 picks up an image of the manipulator 101 and its periphery. The distance calculator 62 measures a distance between the manipulator 101 and an object in the periphery of the manipulator 101 from output information of the camera 61. The camera 61 and the distance calculator 62 construct an observing unit. The judging unit 63 predicts a collision of the manipulator 101 and an object whose image is picked up by the camera 61 based on the output of the distance calculator 62 and controls the amplifier 64 based on the result. The amplifier 64 changes the amount of current flown into the wire rods 38 according to the output of the judging unit 63. In this way, coupling forces N1, N2, . . . between the members 31, 32, 33, . . . by the wire rods 38 change. The amplifier 64 falls into the concept of a force setting unit for setting the magnitudes of the coupling forces. The wire rods 38 generate forces in a contracting direction upon a temperature rise.

The operations of the structure 7, the manipulator 101 and the control system constructed as above are described below.

It is assumed that power is applied to the wire rods 38 and the coupling forces between the respective members 31, 32, 33, . . . are equal to or larger than N1, N2, . . . in a normal state. The camera 61 picks up a still image of the manipulator 101 and an object 9 and sends an image signal as a frame to the distance calculator 62. The distance calculator 62 calculates a distance change between the manipulator 101 and the object 9 from the last frame image and the present frame image, calculates an absolute distance from the present frame image, and then sends a signal indicating the distance change and a signal indicating the absolute distance to the judging unit 63. The judging unit 63 feeds a signal in accordance with these signals to the amplifier 64.

If a collision of the manipulator 101 and the object 9 is predicted by the judging unit 63, the current of the wire rods 38 is set equal to or below a specified value. In this way, pulling forces generated by the wire rods 38 are reduced and the coupling forces by the wire rods 38 fall below N1, N2, . . . .

If the object 9 collides with the manipulator 101 in this state, the members of the arm 3 are easily separated or displaced to alleviate an impact caused by the collision of the object 9 due to a reduction in resistance forces in a transverse sectional direction resulting from a reduction in the coupling forces.

As described above, according to this embodiment, the coupling forces are weakened according to needs only when a collision is predicted. Therefore, an impact in the event of the collision can be more alleviated while the rigidity of the structure 7 is maintained.

Figure 9:
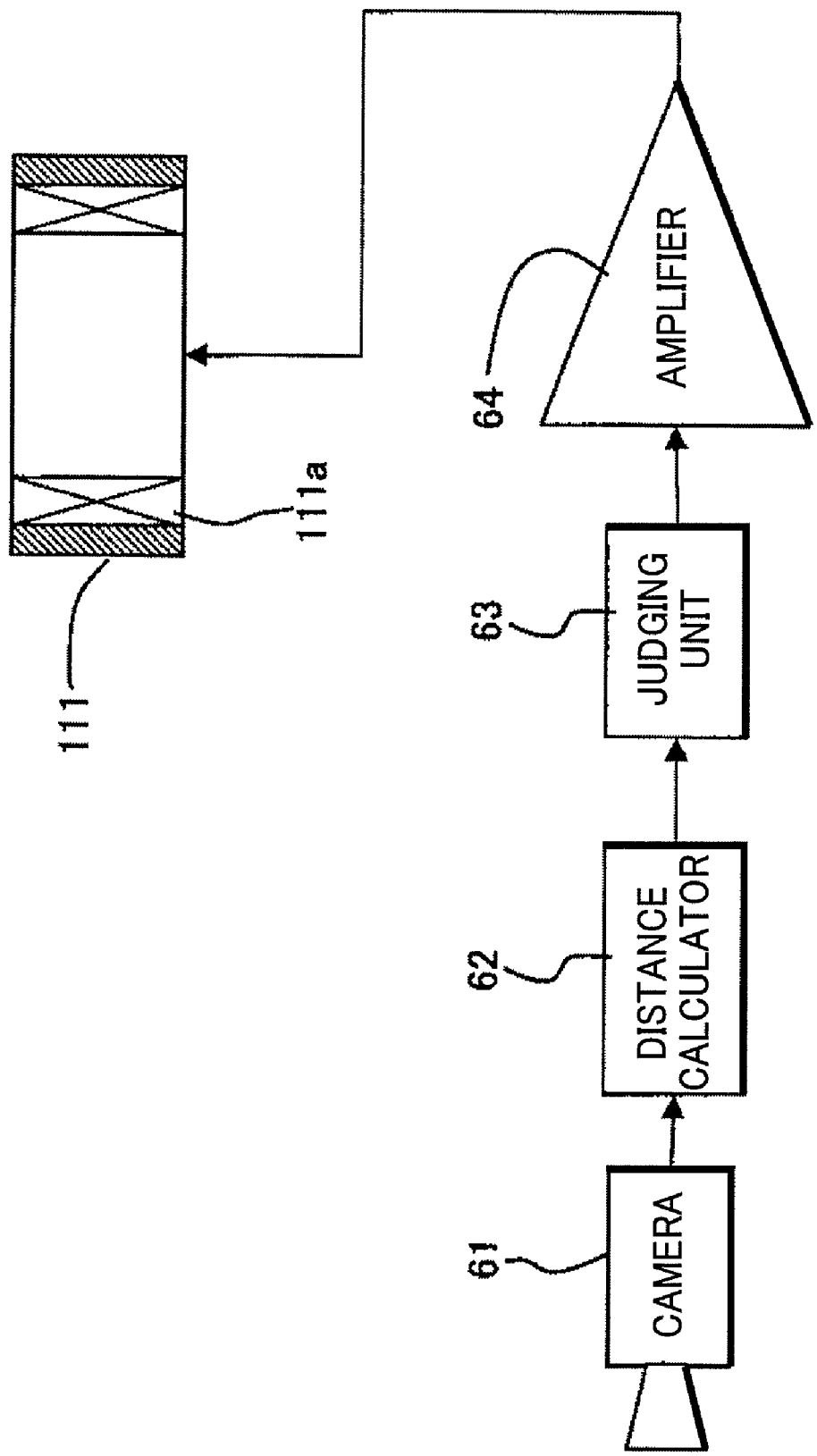
FIG. 9 is a diagram schematically showing a structure control system provided with a structure according to a modification of the second embodiment of the invention.

Concerning the arm 3, it is also possible to connect the members, for example, by a magnet (FIG. 5) as described in the first embodiment. This example is shown in FIG. 9. If a magnet 111a is an electromagnet, the members can be easily separated and displaced in the event of a collision by reducing a current by means of the amplifier 64 as described above if the collision is predicted. If the magnet 111a is a permanent magnet, a magnet rotating mechanism (not shown) may be provided to move the magnet 111a as described with reference to FIGS. 6A and 6B. In this case, the amplifier 64 may drive the magnet rotating mechanism.

The structure of the members can be those shown in FIGS. 3 and 4. Depending on the system, it is also possible to on/off control the amplifier 64.

Concerning the wire rods 38, if it is difficult to control the coupling forces, improvement may be made, for example, by providing springs in series.

Although the camera 61 and the distance calculator 62 construct the observing unit in the second embodiment, they are means for converting physical quantities, i.e. the distance and the distance change into electrical signals and, hence, another means may be adopted. For example, an ultrasonic distance sensor, a distance sensor using a stereo camera, an infrared sensor or a laser or the like can be an example of the observing unit. Alternatively, the observing unit may be means for observing an electrical capacitance change based on a distance between the manipulator 101 and its periphery.

It is also possible to use the wire rods 38 as signal lines and power lines, for example, by superimposing a high frequency waves on the wire rods 38.

Third Embodiment

Hereinafter, a third embodiment of the present invention is described with reference to the drawing.

Figure 10:
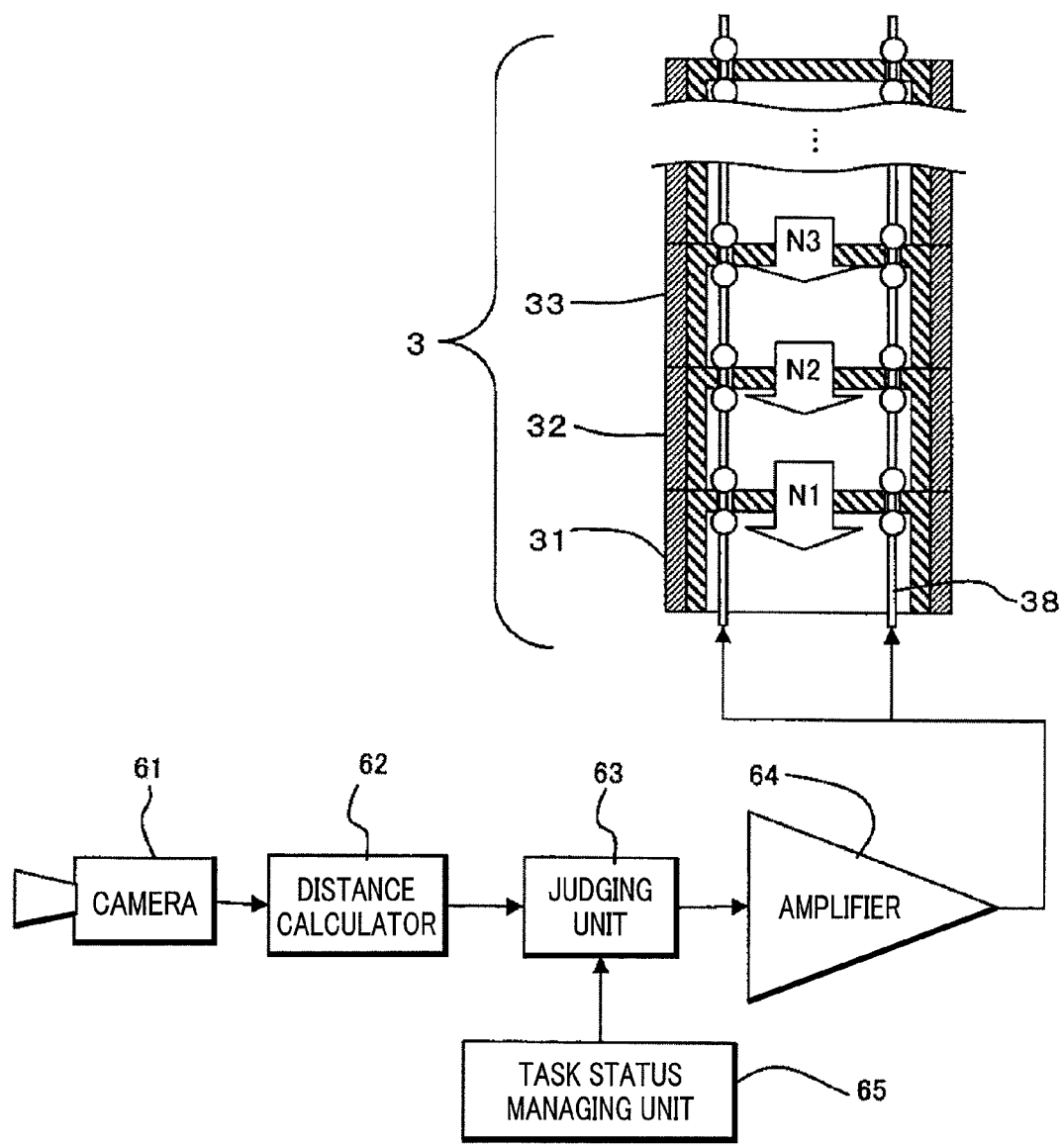
FIG. 10 is a diagram schematically showing a structure control system provided with a structure according to a third embodiment of the invention.

FIG. 10 shows essential parts of a structure, a manipulator and a control system according to the third embodiment of the present invention. The manipulator itself is the same as the manipulator 101 of FIG. 7 according to the second embodiment. Here, the same constituent members are identified by the same reference numerals. As shown in FIG. 10, the control system includes a camera 61, a distance calculator 62, a judging unit 63, an amplifier 64 and a task status managing unit 65. The task status managing unit 65 has a function of grasping and predicting a task executing status of the manipulator and being able to output a signal to strengthen or weaken coupling forces to the judging unit 63.

For example, in the event of an impact resulting a collision of an external object (e.g. object 9 of the second embodiment), specified members need to be separated or displaced to suppress the impact in an arm 3 or the like. If a hand mechanism 6 grips a hard object (e.g. a metal bar) and further places it on a hard shelf (e.g. metal plate), it is very difficult to reliably place it at a speed of zero, wherefore an impact is created in the arm 3 and the like upon placing the object and there is a possibility of creating acceleration equivalent to the collision of an external object.

Thus, if reaction forces caused by acceleration created in arms 2, 3, 4 exceed reaction forces for generating normal coupling forces N1, N2, . . . and maximum static friction forces F1, F2, . . . , the members are unnecessarily separated or displaced. In order to avoid this, the task status managing unit 65 outputs a signal to the judging unit 63 to strengthen the coupling forces if a possibility that the present task creates an impact such as the one created upon placing a hard object in the manipulator 101 is predicted. The judging unit 63 prioritizes the signal of the task status managing unit 65 if no collision of another object is predicted, and can prepare for an impact created upon placing a hard object by increasing the coupling forces with a drive current of the amplifier 64 kept unchanged.

Since a possibility of creating acceleration is hardly predicted in a normal constant-speed conveying task, the task status managing unit 65 outputs a signal to the judging unit 63 to weaken the coupling forces to further improve safety.

The situation of placing a hard object is cited as an example of prediction to strengthen the coupling forces by the task status managing unit 65, but an instruction to strengthen the coupling forces is given for a task predicted to create acceleration even in other situations. For example, the coupling forces are strengthened also in the case of executing a task in which a moving system runs over steps or on an uneven surface when the structure 7 is mounted on the moving system or in the case of executing a task of handling a nonlinear object with click tactile feel. Further, the coupling forces may be changed in synchronism with an acceleration/deceleration signal predicted in a normal task.

In the third embodiment as well, various variations described in the second embodiment can be applied.

Fourth Embodiment

Hereinafter, a fourth embodiment of the present invention is described with reference to the drawing.

Figure 11:
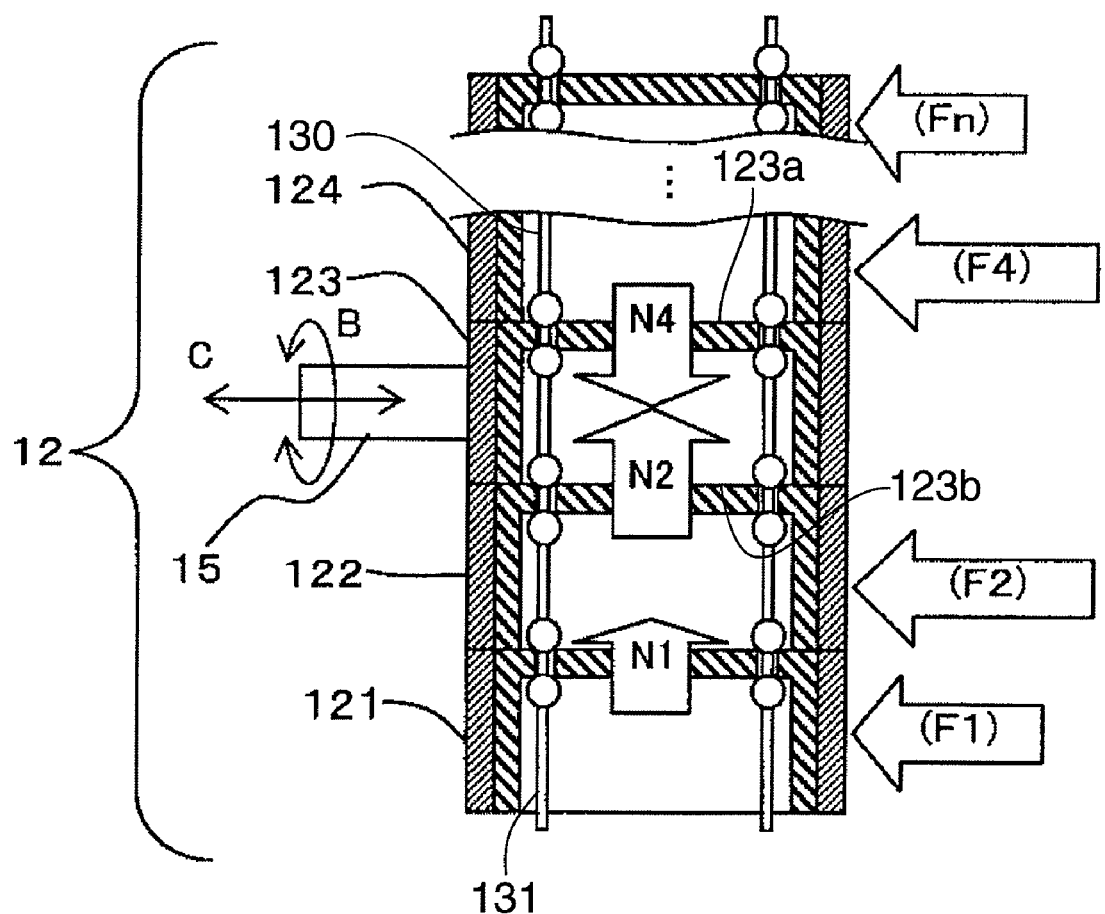
FIG. 11 is a section partly showing a structure according to a fourth embodiment of the invention.

FIG. 11 is a diagram showing a structure according to the fourth embodiment of the present invention. In FIG. 11, a drive shaft 15 is fixed to a member 123 of an arm 12 as the structure. The arm 12 can be rotated in directions B and moved in parallel with directions C by this drive shaft 15.

The arm 12 is, as a whole, constructed similar to the arm 3 shown in the first embodiment, but mainly differs therefrom in that a fixing point to be fixed to a fixed object is the intermediate member 123 of the arm 12. In other words, the member 123 is a base end side member and includes a leading end surface (upper end surface in FIG. 11) 123a and a second leading end surface (lower end surface in FIG. 11) 123b opposite to the leading end surface 123a. A part between the leading end surface 123a and the second leading end surface 123b serves as a fixing portion to be fixed to the fixed object. Further, each member from member 124, . . . connected with the leading end surface 123a of the member 123 to a member 41 (see FIG. 1A) serves as an intermediate member, and a member 42 serves as a leading end side member. A member 122 connected with the second leading end surface 123b of the member 123 serves as a second intermediate member, and a member 121 serves as a second leading end side member. Accordingly, the member 121 neither directly nor indirectly connected with the fixed member. Wire rods 130 for generating coupling forces of a driving member 123, the member 124 and the like function as a coupling force generator, and wire rods 131 for generating coupling forces of the driving member 123, the members 122 and 121 function as a second coupling force generator. In this structure, coupling forces N1, N2, . . . between the members generated by the wire rods 130 and the wire rods 131 are set to increase toward the member 123 and to decrease away from the member 123, with the result that maximum friction forces F1, F2, . . . are maximized on the surfaces adjacent to the driving member 123. In other words, the magnitude (first magnitude) of the coupling force generated between the members 123 and 122 is equal to or larger than that (second magnitude) of the coupling force generated between the members 122 and 121.

The magnitude of the coupling force generated between the members 123 and 124 and that of the coupling force generated between the member 123 and 122 may be equal or different. The magnitude relation of the coupling forces may be suitably set depending to the number of the members to be connected and the like.

The operation of this structure is not described since this structure is equivalent to a structure in which the arm 3 of the first embodiment extends from each of the opposite ends of the member 123. The arm 12 needs not be symmetrical with respect to the member 123.

Fifth Embodiment

Hereinafter, a fifth embodiment of the present invention is described with reference to the drawings.

Figure 12A:
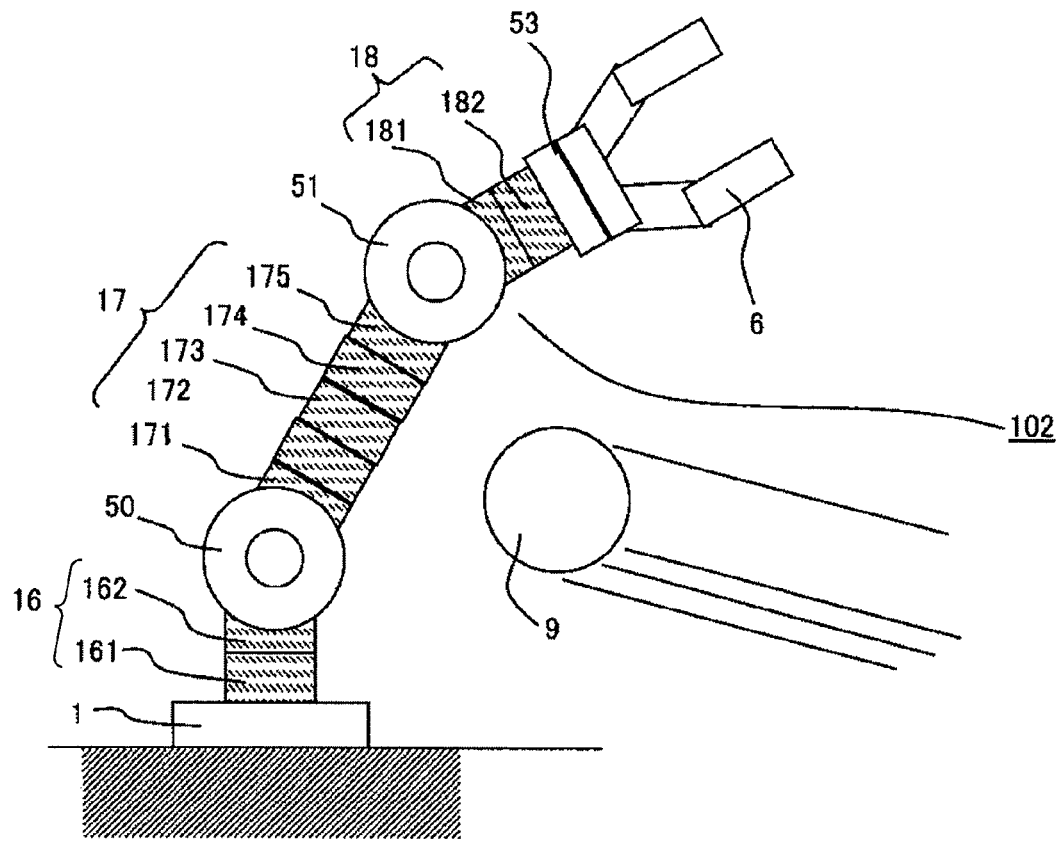
FIGS. 12A and 12B are diagrams schematically showing a structure control system provided with a structure according to a fifth embodiment of the invention.
Figure 12B:
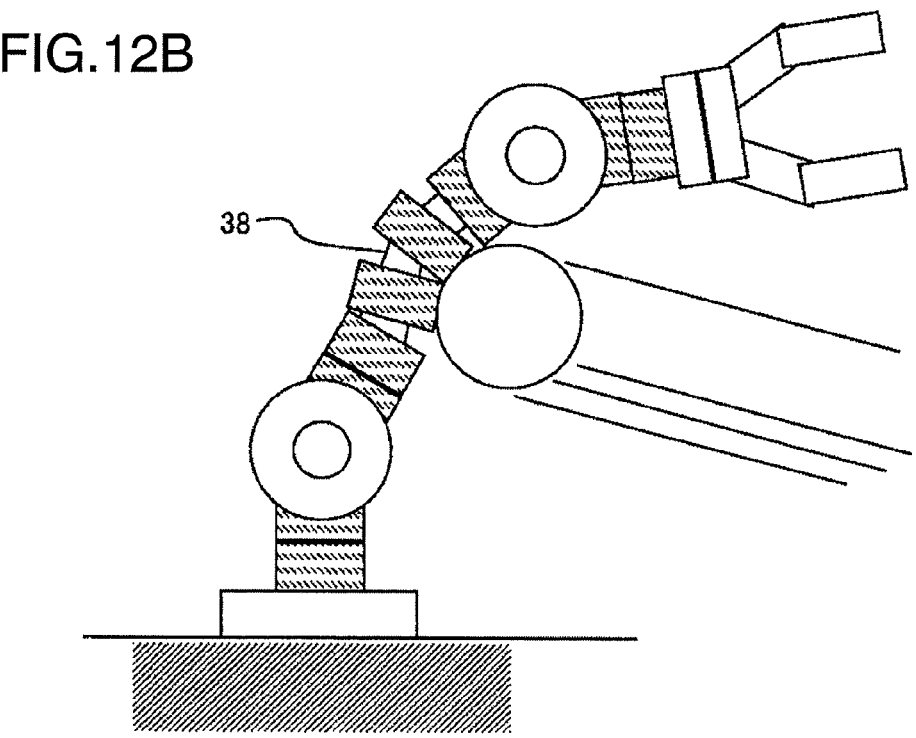
Figure 13:
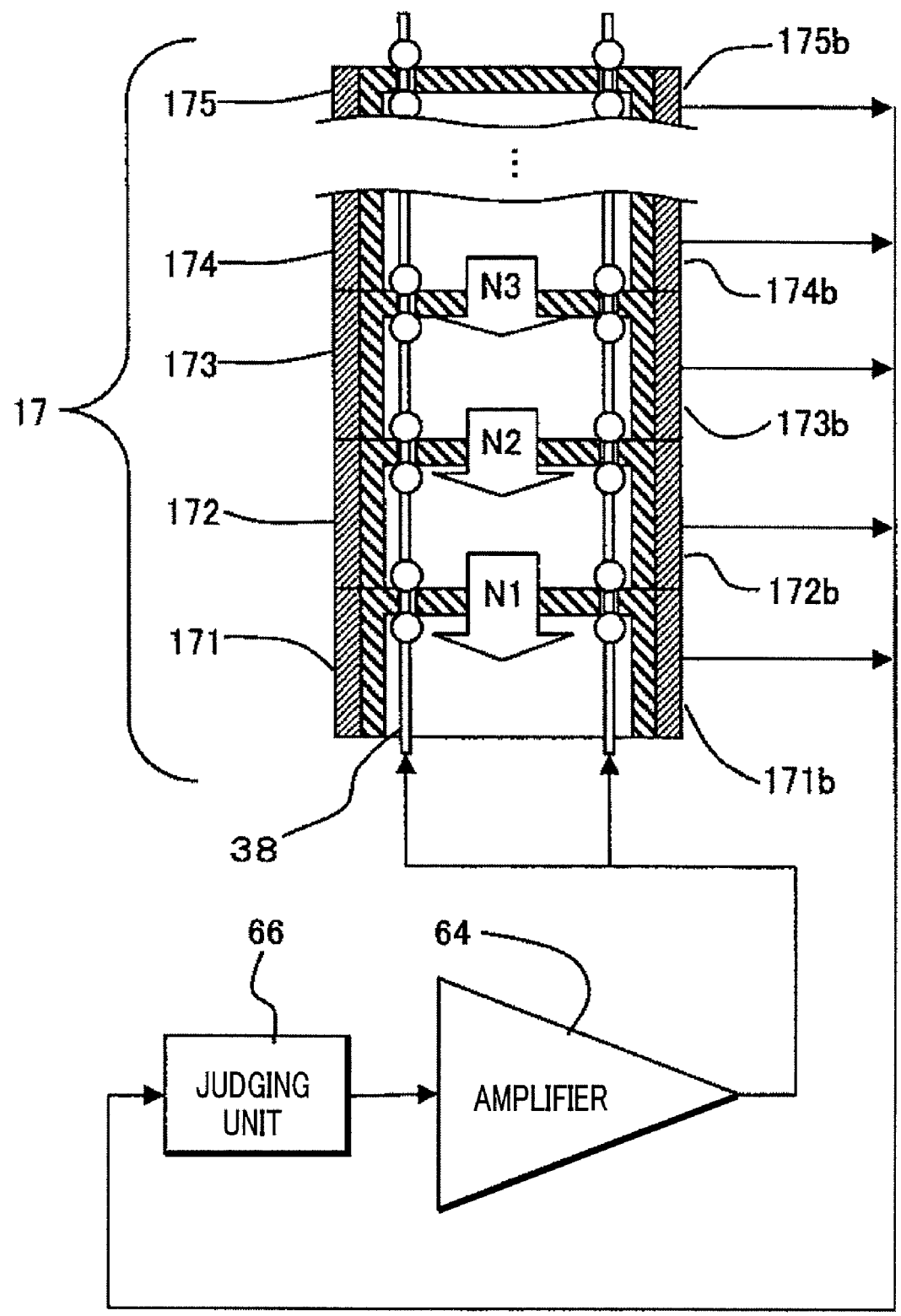
FIG. 13 is a diagram schematically showing a structure control system according to the fifth embodiment of the invention.

FIGS. 12A, 12B and 13 show a structure, a manipulator and a control system according to the fifth embodiment of the present invention. The manipulator 102 of this embodiment includes arms 16, 17 and 18 whose outer coverings are different from those the arms 2, 3 and 4 of the second embodiment. FIG. 13 shows the arm 17 as a representative. The arm 17 includes members 171 to 175, and outer coverings 171b to 175b of the members 171 to 175 are respectively constructed as contact sensors. The arms 16 and 18 are constructed similar to the arm 17. An amplifier 64 and wire rods 38 for giving coupling forces are also the same as in the second embodiment.

The contact sensors 171b to 175b output signals upon being externally contacted. These signals are collected to a judging unit 66. Although not shown, signals of contact sensors of the other arms are similarly inputted to the judging unit 66. The judging unit 66 instructs the amplifier 64 to decrease a current upon receiving the signal from the contact sensor.

The amplifier 64 changes the amount of current flown into the wire rods 38 according to the output of the judging unit 66 to change coupling forces N1, N2, . . . . The amplifier 64 and the respective members 171 to 175 construct a force setting unit. The wire rods 38 made of a shape-memory alloy generate forces in a contracting direction upon a temperature rise.

The operations of the structure, the manipulator and the control system constructed as above are described below.

It is assumed that power is applied to the wire rods 38 and coupling forces are equal to or larger than N1, N2, . . . in a normal state. If an object 9 comes into contact with the contact sensors 173b, 174b of the members 173, 174 of the arm 17 as shown in FIG. 12B, the contact sensors 173b, 174b output signals. These signals are sent to the judging unit 66. Then, the judging unit 66 sends a signal to the amplifier 64 to reduce the current, whereby the wire rods 38 are cooled to reduce the pulling forces and the coupling forces fall to values below N1, N2, . . . .

In this way, the coupling forces are reduced immediately after the object 9 comes into contact with the manipulator 102 and resistance forces in a transverse section direction are reduced, wherefore the arm 17 enters a state where the members are easily separated to alleviate an impact resulting from the collision of the object 9.

As described above, according to this embodiment, the coupling forces in the event of a collision can be weakened to more alleviate the impact by providing the contact sensors 171b to 175b.

Instead of the connecting structure by the wire rods 38, the arm 17 can adopt, for example, a connecting structure using magnets in the arm 11 of FIG. 5 described in the first embodiment. Particularly, if the magnets 111a are electromagnets, a collision can be prepared for within a short time by instantaneously reducing the current at the time of contact, whereby the members can be more easily separated. In addition, various connected states of the arms according to the second embodiment can be utilized also in this embodiment.

It can be also thought to install force sensors instead of detecting the contact using the contact sensors. Using the force sensors, a force produced when the external object 9 comes into contact with the manipulator 102 is detected. By changing the coupling force based on the detected force, desired effects can be obtained. In the case of using the force sensors in this way, reaction is slower as compared with the fourth embodiment, but the force exerted from the external object 9 can be precisely dealt with.

Manipulators, control systems and the like including a plurality of the structures described in the first to fifth embodiments and arranged in parallel as arms can also be embodied within the scope of the present invention. In this case, an effect of alleviating a collision is equivalent and the entire deformation and the like can be reduced.

Although the construction for controlling the maximum static friction forces by the coupling forces is described as the construction for setting forces resisting in the transverse sectional direction in the second, third and fifth embodiments, it is also possible to set the forces resisting in the transverse sectional direction (e.g. kinetic friction forces) themselves. A construction for setting forces resisting against the forces in the transverse sectional direction by changing the shapes of the member dividing surfaces can be adopted as such a construction. For example, the angle of the inclined surfaces 88 formed on the end surfaces forming the connecting surfaces between the members as shown in FIG. 4 may be changed without changing the coupling forces themselves. In this construction, it is possible to set the inclinations of the inclined surfaces 88 to increase on the connecting surfaces closer to the fixed object (closer to the axial direction) and to decrease on the connecting surfaces more distant from the fixed object. Besides successively changing the inclined surfaces 88, the above construction can be realized by changing the heights of projections to successively change the magnitudes of shear forces created in the respective members or can also be realized by changing the surface coarsenesses of the connecting surfaces held in close contact.

As descried above, in the case of using, for example, kinetic friction forces, the speeds of the respective members to return to their initial positions in the event of a collision can be slowed due to the influence of the kinetic friction forces. Thus, as compared with the case of using the maximum static friction forces or the magnet, a possibility of affecting the object 9 during the returning movement can be reduced.

Better effects can be obtained by suitably combining the construction using the maximum static friction forces or the magnet and the construction using the kinetic friction forces.

INDUSTRIAL APPLICABILITY

The structure, the manipulator and the control system according to the present invention are useful as safe structure, manipulator and control system capable of alleviating an impact in the event of a collision.

SUMMARY OF THE EMBODIMENTS

The above embodiments are summarized as follows.

(1) The structure of each of the above embodiments is made up of at least three members aligned and connected with each other, and is to be directly or indirectly connected with the fixed body. This structure includes the first member, the second member and the third member. The first member includes the fixing portion (base portion) to be directly or indirectly connected to the fixed body, and the leading end surface. The third member includes the base end surface and the leading end surface located opposite to the base end surface. The second member includes the first end surface and the second end surface located opposite to the first end surface and arranged between the first and third members with the first end surface held in contact with the leading end surface of the first member and the second end surface held in contact with the base end surface of the third member. The coupling force generator is provided to generate a first coupling force for pressing the leading end surface of the first member and the first end surface of the second member against each other and a second coupling force for pressing the second end surface of the second member and the base end surface of the third member against each other. The first and second members are relatively displaced from each other upon the application of an external force larger than a force created between the leading end surface of the first member and the first end surface of the second member by the first coupling force, whereas the second and third members are relatively displaced upon the application of an external force larger than a force created between the second end surface of the second member and the base end surface of the third member by the second coupling force.

In the above embodiments, if an external force smaller than a force created between the leading end surface of the base end side member and the first end surface of the intermediate member by a coupling force of a first magnitude is applied, for example, to the intermediate member, the base end side member and the intermediate member are not relatively displaced. However, if an external force larger than the above force is applied, for example, to the intermediate member, the base end side member and the intermediate member are relatively displaced. Further, if an external force smaller than a force created between the second end surface of the intermediate member and the base end surface of the leading end side member by a coupling force of a second magnitude is applied, for example, to the intermediate member, the intermediate member and the leading end side member are not relatively displaced. However, if an external force larger than the above force is applied, for example, to the intermediate member, the intermediate member and the leading end side member are relatively displaced. By the relative displacement, the external force is received not by the entire structure, but by a part of the structure. Therefore, even if the structure collides with an external object, for example, during a movement, an inertial force exerted to the external object can be reduced.

(2) Since the first coupling force is larger than the second coupling force, the structure is easily stabilized even upon the application of an external force. Further, since the displacement of the leading end side member relative to the intermediate member is more likely to occur than that of the intermediate member relative to the base end side member, an impact force created upon the collision with an external person or object can be more easily reduced even if this structure is used in the manipulator. In other words, since a movable range of the leading end side member is larger than that of the intermediate member, the leading end side member collides with an external object with a higher possibility. However, by making the leading end side member with a higher probability of collision more easily displaced, an impact force created upon the collision with an external person or object can be alleviated.

(3) It is preferable that the second member is made up of a plurality of intermediate members connected with each other; and that the coupling force generator generates a coupling force satisfying $F(i) > F(i+1)$ for an arbitrary "i" if $F(i)$ denotes a coupling force generated on the $i^{th}$ contact surface from the base portion out of contact surfaces of the intermediate members. Specifically, it is preferable that the intermediate members include a plurality of connecting members connected while being aligned in contact with each other; that the coupling force generator generates coupling forces also on contact surfaces of the connecting members held in contact with each other; that $F(i) > F(i+1)$ is satisfied for an arbitrary "i" if $F(i)$ denotes a force generated on the $i^{th}$ contact surface from the base end side out of the contact surfaces between the base end side member and the connecting member held in contact therewith, the respective contact surfaces between the respective connecting members and the contact surfaces between the leading end side member and the connecting member held in contact therewith.

In this mode, the stability of the intermediate members themselves can be improved even upon the application of an external force. Even if this structure has a larger movable range and has a higher possibility of colliding with an external object toward the leading end side as in the case of being used in the manipulator, an impact force in the intermediate members in the event of a collision can be more easily reduced.

(4) The forces generated on the contact surfaces may be friction forces. In other words, the first and second coupling forces generated by the coupling force generator may be static friction forces. Alternatively, the first and second coupling forces generated by the coupling force generator may be kinetic friction forces.

(5) The first and second coupling forces generated by the coupling force generator may be magnetic forces. Further, the coupling force generator may be steps provided at least on parts of the first, second and third members.

(6) A joint portion may be arranged between any two adjacent ones of the first, second and third members. In other words, the plurality of connecting members may include a first connecting member and a second connecting member adjacent to the first connecting member at the leading end side, and the structure may further include a joint portion arranged between the first and second connecting members.

In this mode, a part of the joint portion at the leading end side can be bent relative to a part thereof at the base end side. Even in this case, the stability of the structure upon the application of an external force can be ensured.

(7) The fixing portion of the base end side member may be defined by the base end surface opposite to the leading end surface. In this mode, the intermediate member and the leading end side member are aligned in one direction with respect to the base end side member.

(8) The base end side member may include a second leading end surface opposite to the leading end surface; the fixing portion may be defined by a part between the leading end surface and the second leading end surface; the structure may include a second intermediate member having a first end surface and a second end surface located opposite to the first end surface and connected with the second leading end surface of the base end side member, a second leading end side member connected with the second intermediate member, and a second coupling force generator for generating a coupling force of a first magnitude for pressing the second leading end surface of the base end side member and the first end surface of the second intermediate member against each other and a coupling force of a second magnitude for pressing the second end surface of the second intermediate member and the base end surface of the second leading end side member against each other.

In this mode, the intermediate member and the leading end side member are arranged at one side of the base end side member, and the second intermediate member and the leading end side member are arranged at the opposite side. In other words, the base end side member fixed to the fixed body is located between the leading end side member and the second leading end side member.

(9) The first coupling force for pressing the second leading end surface of the base end side member and the first end surface of the second intermediate member against each other is equal to or larger than the second coupling force for pressing the second end surface of the second intermediate member and the base end surface of the second leading end side member against each other.

In this mode, the structure is more easily stabilized even upon the application of an external force. Further, since a displacement of the second leading end side member relative to the intermediate member is more likely to occur than that of the second intermediate member relative to the base end side member, an impact force created upon the collision with an external person or object can be more easily reduced even if this structure is used in the manipulator. In other words, since a movable range of the second leading end side member is larger than that of the second intermediate member, the second leading end side member collides with an external object with a higher possibility. However, by making the second leading end side member with a higher probability of collision more easily displaced, an impact force created upon the collision with an external person or object can be alleviated.

(10) The coupling force generator preferably generates a coupling force satisfying $F(j)>F(j+1)$ for an arbitrary "j" when the respective first, second and third members are sectioned into member groups at the joint portion and $F(j)$ denotes a coupling force generated on the $j^{th}$ contact surface from the base portion in each member group.

(11) It is preferable that the second intermediate member includes a plurality of second connecting members connected while being aligned in contact with each other; and that $F(i)>F(i+1)$ is satisfied for an arbitrary "i" if $F(i)$ denotes a force generated on the $i^{th}$ contact surface from the base end side out of contact surfaces between the base end side member and the second connecting member held in contact therewith, the respective contact surfaces between the respective second connecting members and the contact surfaces between the second leading end side member and the second connecting member held in contact therewith.

In this mode, the stability of the second intermediate members themselves can be improved even upon the application of an external force. Even if this structure has a larger movable range and has a higher possibility of colliding with an external object toward the leading end side as in the case of being used in the manipulator, an impact force in the second intermediate members in the event of a collision can be more easily reduced.

(12) The coupling force generator may be wire rods for supplying signals or power to the robot hand. In this mode, the separation of the intermediate members and the leading end side member can be prevented while displacements thereof are permitted.

(13) The coupling force generator may generate such coupling forces that relative movable ranges of the respective members are only in directions perpendicular to the axes of the respective members.

(14) The coupling force generator may generate such coupling forces that relative movable ranges of the respective members are only in directions about the axes of the respective members. In this mode, the central axial positions of the intermediate member and the leading end side member are not displaced even upon the application of an external force. Thus, even if the intermediate member and the leading end side member are formed to have tubular shape, members and the like inserted in the intermediate member and the leading end side member can be protected.

(15) The coupling force generator may include a magnet or an electromagnet for generating the coupling forces by a magnetic force. In this mode, the intermediate member and the leading end side member can be relatively movably connected to the base end side member without being directly connected therewith.

(16) The above embodiments relate to a structure control system comprising an observing unit for measuring a relative positional relationship of a structure and an external object; a judging unit for predicting a collision of the structure and the external object based on a measurement result by the observing unit; and a force setting unit for changing the magnitudes of the coupling forces generated by the coupling force generator based on the prediction of the judging unit. In other words, the above embodiments relate to a structure control system comprising a structure to be fixed to a fixed body and including a base end side member having a fixing portion to be directly or indirectly fixable to the fixed body and a leading end surface, a leading end side member having a base end surface and a leading end surface located opposite to the base end surface, an intermediate member having a first end surface and a second end surface located opposite to the first end surface and arranged between the base end side member and the leading end side member with the first end surface held in contact with the leading end surface of the base end side member and the second end surface held in contact with the base end surface of the leading end side member, a coupling force generator for generating a coupling force of a first magnitude for pressing the leading end surface of the base end side member and the first end surface of the intermediate member and a force of a second magnitude for pressing the second end surface of the intermediate member and the base end surface of the leading end side member, wherein the base end side member and the intermediate member are relatively displaced upon the application of an external force larger than a force created between the leading end surface of the base end side member and the first end surface of the intermediate member by the coupling force of the first magnitude, whereas the intermediate member and the leading end side member are relatively displaced upon the application of an external force larger than a force created between the second end surface of the intermediate member and the base end surface of the leading end side member by the coupling force of the second magnitude; an observing unit for measuring a relative positional relationship of the structure and an external object; a judging unit for predicting a collision of the structure and the external object based on a measurement result by the observing unit; and a force setting unit for setting the magnitudes of the coupling forces generated by the coupling force generator and changing the magnitudes of the set coupling forces based on the output of the judging unit.

In this structure control system, the magnitudes of the coupling forces generated by the coupling force generator can be changed if a collision of the structure and an external object is predicted by the judging unit. Thus, it is possible to reduce an impact force in the event of a collision while ensuring the rigidity of the structure in normal time.

(17) The above embodiments relate to a structure control system comprising a force sensor provided on the outer surface of the structure and a force setting unit for changing the magnitudes of the coupling forces generated by the coupling force generator based on a measurement result by the force sensor.

(18) The above embodiments relate to a structure control system comprising a structure to be fixed to a fixed body and including a base end side member having a fixing portion to be directly or indirectly fixable to the fixed body and a leading end surface, a leading end side member having a base end surface and a leading end surface located opposite to the base end surface, an intermediate member having a first end surface and a second end surface located opposite to the first end surface and arranged between the base end side member and the leading end side member with the first end surface held in contact with the leading end surface of the base end side member and the second end surface held in contact with the base end surface of the leading end side member, a coupling force generator for generating a coupling force of a first magnitude for pressing the leading end surface of the base end side member and the first end surface of the intermediate member and a force of a second magnitude for pressing the second end surface of the intermediate member and the base end surface of the leading end side member, wherein the base end side member and the intermediate member are relatively displaced upon the application of an external force larger than a force created between the leading end surface of the base end side member and the first end surface of the intermediate member by the coupling force of the first magnitude, whereas the intermediate member and the leading end side member are relatively displaced upon the application of an external force larger than a force created between the second end surface of the intermediate member and the base end surface of the leading end side member by the coupling force of the second magnitude; a task status managing unit for grasping a task executed status of the structure; and a force setting unit for setting the magnitudes of the coupling forces generated by the coupling force generator and changing the magnitudes of the set coupling forces based on the output of the task status managing unit.

In this structure control system, the magnitudes of the coupling forces generated by the coupling force generator can be changed if the application of an external force to the structure is predicted from the task executed status grasped by the task status managing unit. Thus, it is possible to reduce an impact force upon the application of an external force while ensuring the rigidity of the structure in normal time.

(19) The above embodiments relate to a structure control system comprising a structure to be fixed to a fixed body and including a base end side member having a fixing portion to be directly or indirectly fixable to the fixed body and a leading end surface, a leading end side member having a base end surface and a leading end surface located opposite to the base end surface, an intermediate member having a first end surface and a second end surface located opposite to the first end surface and arranged between the base end side member and the leading end side member with the first end surface held in contact with the leading end surface of the base end side member and the second end surface held in contact with the base end surface of the leading end side member, a coupling force generator for generating a coupling force of a first magnitude for pressing the leading end surface of the base end side member and the first end surface of the intermediate member and a force of a second magnitude for pressing the second end surface of the intermediate member and the base end surface of the leading end side member, wherein the base end side member and the intermediate member are relatively displaced upon the application of an external force larger than a force created between the leading end surface of the base end side member and the first end surface of the intermediate member by the coupling force of the first magnitude, whereas the intermediate member and the leading end side member are relatively displaced upon the application of an external force larger than a force created between the second end surface of the intermediate member and the base end surface of the leading end side member by the coupling force of the second magnitude; a contact sensor arranged on the structure; and a force setting unit for setting the magnitudes of the coupling forces generated by the coupling force generator and changing the magnitudes of the set coupling forces based on the output of the contact sensor.

In this structure control system, the magnitudes of the coupling forces generated by the coupling force generator can be changed if a collision of the structure and an external object is detected by the contact sensor. Thus, it is possible to reduce an impact force upon the application of an external force while ensuring the rigidity of the structure in normal time.

(20) The above embodiments relate to a manipulator a structure to be fixed to a fixed body and including a base end side member having a fixing portion to be directly or indirectly fixable to the fixed body and a leading end surface, a leading end side member having a base end surface and a leading end surface located opposite to the base end surface, an intermediate member having a first end surface and a second end surface located opposite to the first end surface and arranged between the base end side member and the leading end side member with the first end surface held in contact with the leading end surface of the base end side member and the second end surface held in contact with the base end surface of the leading end side member, a coupling force generator for generating a coupling force of a first magnitude for pressing the leading end surface of the base end side member and the first end surface of the intermediate member and a force of a second magnitude for pressing the second end surface of the intermediate member and the base end surface of the leading end side member, wherein the base end side member and the intermediate member are relatively displaced upon the application of an external force larger than a force created between the leading end surface of the base end side member and the first end surface of the intermediate member by the coupling force of the first magnitude, whereas the intermediate member and the leading end side member are relatively displaced upon the application of an external force larger than a force created between the second end surface of the intermediate member and the base end surface of the leading end side member by the coupling force of the second magnitude; and an end effector provided at the leading end side member of the structure, wherein the intermediate member includes a plurality of connecting members connected while being aligned in contact with each other, the coupling force generator generates coupling forces also on contact surfaces of the connecting members held in contact with each other, and $F(i)>F(i+1)$ is satisfied for an arbitrary "i" when $F(i)$ denotes a force generated on the $i^{th}$ contact surface from the base end side out of the contact surfaces between the base end side member and the connecting member held in contact therewith, the respective contact surfaces between the respective connecting members and the contact surfaces between the leading end side member and the connecting member held in contact therewith.

(21) The above embodiments relate to a structure having a longitudinal direction and comprising a plurality of members divided by flat surfaces or curved surfaces whose average normals are local tangents in the longitudinal direction, wherein an average surface of the flat or curved surfaces is defined to extend in a transverse sectional direction; normal positions of the adjacent members in the transverse sectional direction are defined; when a force acts in the transverse sectional direction between a certain member and the member adjacent thereto, the certain member is not displaced from the normal position if a force smaller than a certain force F acts on the certain member and a displacement component is generated in a direction of the force F if a force equal to or larger than the force F acts on the certain member; the value of the force F can be individually set between each pair of adjacent members or the values of the forces F are collectively set.

By this construction, at least some of the members of the structure made up of the plurality of members are displaced in response to an impact even if a certain collision occurs to the structure, whereby an impact force can be alleviated.

(22) In the structure according to the above (21), the value of the force F can be preferably set in accordance with a specified signal.

(23) In the structure according to the above (21), it is preferable that attraction forces acting between the adjacent members are defined as coupling forces; and that forces in the transverse sectional direction corresponding to the coupling forces are generated between the adjacent members as the forces F.

(24) In the structure according to the above (21), it is preferable that attraction forces acting between the adjacent members are defined as coupling forces; and that a restoring force to the normal position is created when the certain member is displaced in the transverse sectional direction from the normal position relative to the adjacent member and is increased by a linear function or a higher order function in the degree of a polynomial in relation to the amount of displacement.

(25) The structure according to the above (21) is a single series structure made up of n members, the first member serving as a fixed end or a base end side member, on which a driving force acts, and the $n^{th}$ member serving as a free end, wherein $F(i)>F(i+1)$ is preferably satisfied for an arbitrary "i" in this series structure.

(26) The structure according to the above (21) is a single series structure made up of n members, the $k^{th}$ member from an end serving as a fixed end or a base end side member, on which a driving force acts, and the first and $n^{th}$ member serving as free ends, wherein it is preferable that $F(i)<F(i+1)$ is satisfied for an arbitrary "i" which is smaller than k and $F(i-1)>F(i)$ is satisfied for an arbitrary "i" which is larger than k in the series structure.

(27) The above embodiments relate to a control system comprising the structure according to the above (22); an observing unit for measuring a relative positional relationship of the structure and an external object; and a judging unit for predicting a collision of the structure and the object based on information from the observing unit, wherein the control system further comprises a force setting unit for setting the forces F on the structure or in the periphery of the structure and controls the force setting unit according to the output of the judging unit.

(28) The above embodiments relate to a control system comprising the structure according to the above (22); and a task status managing unit for predicting the operation of the structure in accordance with a task, wherein the control system further comprises a force setting unit for setting the forces F on the structure or in the periphery of the structure and controls the force setting unit according to the output of the task status managing unit.

(29) The above embodiments relate to a control system comprising the structure according to the above (22); and a contact sensor, wherein the control system further comprises a force setting unit for setting the forces F on the structure or in the periphery of the structure and controls the force setting unit according to the output of the contact sensor.

(30) In the control system according to any one of the above (27) to (29), the force setting unit is controlled by controlling the coupling forces for the structure in which attraction forces acting between the adjacent members are defined as coupling forces and forces in the transverse sectional direction corresponding to the coupling forces are generated between the adjacent members as the forces F.

(31) The above embodiments relate to a manipulator comprising the structure according to the above (25) and an end effector arranged on the $n^{th}$ member of the structure.

As described above, in the above embodiments, the safe structure, the manipulator and the control system with higher safety can be realized.

This application is based on Japanese Patent Application No. 2007-264279 filed on Oct. 10, 2007 and No. 2008-258303 filed on Oct. 3, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A structure, comprising:
a first member including a base portion fixed to an outside thereof;
a second member;
a third member including a leading end portion; and
a coupling force generator for generating a first coupling force for maintaining a relative positional relationship of the first and second members and a second coupling force for maintaining a relative positional relationship of the second and third members,
wherein
the first, second and third members are connected to each other,
the first coupling force is larger than the second coupling force, the second member is a plurality of intermediate members connected to each other, and the coupling force generator is configured to generate a coupling force satisfying $F(i) > F(i+1)$ for an arbitrary "i" when $F(i)$ denotes a coupling force generated on an $i^{th}$ contact surface from the base portion out of contact surfaces of the intermediate members.

2. A structure according to claim 1, wherein the leading end portion is a robot hand.

3. A structure according to claim 1, wherein the first and second coupling forces generated by the coupling force generator are static frictional forces.

4. A structure according to claim 1, wherein the first and second coupling forces generated by the coupling force generator are kinetic frictional forces.

5. A structure according to claim 1, wherein the first and second coupling forces generated by the coupling force generator are magnetic forces.

6. A structure according to claim 1, wherein the coupling force generator is a pluralit of steps provided at least on parts of the first, second and third members.

7. A structure comprising:

a first member including a base portion fixed to an outside thereof;

a second member;

a third member including a lead end portion; and a coupling force generator for generating a first coupling force for maintaining a relative positional relationship of the first and second members and a second coupling force for maintaining a relative positional relationship of the second and third members, wherein the first, second and third members are connected to each other, the first coupling force is larger than the second coupling force, a joint portion is provided between any adjacent two of the first, second and third members, and the respective first, second and third members are sectioned into member groups at the joint portion, and the coupling force generator is configured to generate a coupling force satisfying $F(j) > F(j+1)$ for an arbitrary "j" when $F(j)$ denotes a coupling force generated on a $j^{th}$ contact surface from the base portion in each member group.

8. A manipulator, comprising:

a first member including a base portion fixed to an outside thereof;

a third member including a leading end portion;

a second member arranged between the first and third members while being connected with the first and third members;

a coupling force generator for generating a first coupling force for pressing an end surface of the first member and that of the second member against each other and a second coupling force for pressing an end surface of the second member and that of the third member against each other; and an end effector provided at the leading end portion of the third member, wherein the second member is made up of a plurality of intermediate members connected to each other while being held in contact with each other, and the coupling force generator is configured to generate coupling forces also on contact surfaces of the intermediate members and generates a coupling force satisfying $F(i) > F(i+1)$ for an arbitrary "i" when $F(i)$ denotes a coupling force generated on an $i^{th}$ contact surface from the base portion out of the contact surfaces of the intermediate members.

* * * * *